United States Patent
Yu et al.

(10) Patent No.: US 10,952,114 B2
(45) Date of Patent: Mar. 16, 2021

(54) METHOD, DEVICE, AND SYSTEM FOR SELECTING USER PLANE FUNCTIONAL ENTITY SUPPORTING NON-3GPP ACCESS

(71) Applicant: HUAWEI TECHNOLOGIES CO., LTD., Guangdong (CN)

(72) Inventors: Youyang Yu, Shanghai (CN); Xiaoji Sun, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 54 days.

(21) Appl. No.: 16/382,746

(22) Filed: Apr. 12, 2019

(65) Prior Publication Data

US 2019/0239133 A1 Aug. 1, 2019

Related U.S. Application Data

(63) Continuation of application No. PCT/CN2017/105363, filed on Oct. 9, 2017.

(30) Foreign Application Priority Data

Oct. 25, 2016 (CN) .......................... 201610939201.7

(51) Int. Cl.
*H04W 36/14* (2009.01)
*H04W 36/00* (2009.01)
*H04W 36/18* (2009.01)

(52) U.S. Cl.
CPC ....... *H04W 36/14* (2013.01); *H04W 36/0033* (2013.01); *H04W 36/18* (2013.01)

(58) Field of Classification Search
CPC .. H04W 36/14; H04W 36/0033; H04W 36/18
See application file for complete search history.

(56) References Cited

U.S. PATENT DOCUMENTS 8,566,455 B1 * 10/2013 Zhao ..................... H04W 76/10
709/227
9,001,682 B2 * 4/2015 Kovvali ................ H04W 88/18
370/252

(Continued)

FOREIGN PATENT DOCUMENTS

| CN | 101090559 A | 12/2007 |
| CN | 101127652 A | 2/2008 |
| WO | 2009/117705 A1 | 9/2009 |

OTHER PUBLICATIONS

S2-166110 Huawei et al.,"Updates of per node-level tunnel model and interim agreement",SA WG2 Meeting #117,Oct. 17-21, 2016, Kaohsiung,total 6 pages.

(Continued)

*Primary Examiner* — Ivan O Latorre
(74) *Attorney, Agent, or Firm* — Womble Bond Dickinson (US) LLP

(57) ABSTRACT

The present application discloses a method, device, and system for selecting a user plane functional entity supporting non-3GPP access ensure service continuity. When a user equipment (UE) performs access via a 3GPP network, subscription data of the UE are obtained by a CP functional entity. The subscription data include indication information that indicates whether the UE is allowed to connect to a non-3GPP network. If the indication information indicates that the UE is allowed to connect to the non-3GPP network, a target UP functional entity supporting the non-3GPP access is selected by the CP functional entity. The present application is applicable to the field of communications technologies.

16 Claims, 13 Drawing Sheets

(56) References Cited

U.S. PATENT DOCUMENTS

| | | | |
|---|---|---|---|
| 2009/0240795 A1* | 9/2009 | Tsirtsis | H04L 61/251 709/223 |
| 2010/0316029 A1* | 12/2010 | Kappler | H04L 41/0813 370/338 |
| 2011/0044253 A1* | 2/2011 | Zisimopoulos | H04W 36/0005 370/328 |
| 2013/0265879 A1 | 10/2013 | Qiang | |
| 2015/0282026 A1* | 10/2015 | Gupta | H04L 1/0026 370/331 |
| 2016/0205064 A1* | 7/2016 | Yan | H04W 8/082 370/389 |
| 2018/0213584 A1* | 7/2018 | Yang | H04W 72/0406 |

OTHER PUBLICATIONS

S2-166283 Qualcomm Inc. et al.,"Way forward on support of non-3GPP access and update to solution 8.6 for support of untrusted non-3GPP access",SA WG2 Meeting #117,Oct. 17-21, 2016, Kaohsiung city, Taiwan,total 10 pages.

S2-165682 Huawei,"Solution evaluation and selection for UE simultaneously connected to 3GPP and N3GPP (sol 4.20 and 4.24)",SA WG2 Meeting #117,Oct. 17-21, 2016, Kaohsiung,total 14 pages.

S2-165681 Huawei et al.,"Working assumptions proposal for N3GPP",SA WG2 Meeting #117,Oct. 17-21, 2016, Kaohsiung, Taiwan,total 6 pages.

S5-165186 Huawei,"Discussion of Control and user plane split",3GPP TSG SA WG5 (Telecom Management) Meeting #109,Aug. 29-Sep. 2, 2016, San Francisco (US),total 7 pages.

S2-165650 Motorola Mobility et al.,"Solution: Standalone non-3GPP access via NG2/NG3",SA WG2 Meeting #118,Oct. 17-21, 2016, Kaohsiung City, Taiwan,total 13 pages.

3GPP TR 23.799 V1.0.2 (Sep. 2016),3rd Generation Partnership Project;Technical Specification Group Services and System Aspects;Study on Architecture for Next Generation System(Release 14),total 423 pages.

S2-164421 LG Electronics ,"Common CP function to manage the sessions via multiple accesses",SA WG2 Meeting #116BIS,Aug. 29-Sep. 2, 2016, Sanya, P.R China,total 5 pages.

S2-165579 Kddi et al.,"Updated Interim Agreements on Session Management related to U-plane function",SA WG2 Meeting #117,Oct. 17-21, 2016, Kaohsiung city, Taiwan,total 3 pages.

* cited by examiner

METHOD, DEVICE, AND SYSTEM FOR SELECTING USER PLANE FUNCTIONAL ENTITY SUPPORTING NON-3GPP ACCESS

CROSS-REFERENCE TO RELATED APPLICATIONS

This application is a continuation of International Application No. PCT/CN2017/105363, filed on Oct. 9, 2017, which claims priority to Chinese Patent Application No. 201610939201.7, filed on Oct. 25, 2016, The disclosures of the aforementioned applications are hereby incorporated by reference in their entireties.

TECHNICAL FIELD

The present application relates to the field of communications technologies, and in particular, to a method, device, and system for selecting a user plane (UP) functional entity supporting non-3rd Generation Partnership Project (non-3GPP) access.

BACKGROUND

To meet challenges of wireless broadband technologies and maintain the leading advantage of 3GPP networks, 3GPP specifications groups developed a next generation mobile communications system (next generation system) network architecture, referred to as a 5th generation (5G) network architecture, at the end of 2016. The architecture not only supports accessing a 5G core network by using wireless technologies defined by the 3GPP specifications groups, but also supports accessing the 5G core network by using non-3GPP access technologies. Core network functions of the 5G core network are classified into a UP function and a control plane (CP) function. A UP functional entity is mainly responsible for packet forwarding, quality of service (QoS) control, charging information statistics collection, and the like. A CP functional entity is mainly responsible for delivering, to the UP, a packet forwarding policy, a QoS control policy, and the like.

Typically, when user equipment (UE) performs access via a 3GPP network, a CP functional entity selects an appropriate UP functional entity for the UE, and then, the UP functional entity establishes a user plane connection to a wireless side and provides related services for the UE. The appropriate UP functional entity is a UP functional entity that currently has relatively low load and that can support a related access point name (APN).

However, when the UE moves from the 3GPP network to a non-3GPP network for access, the previously selected UP functional entity may no longer be suitable to continue serving the UE, and consequently service continuity cannot be ensured.

SUMMARY

Embodiments of the present application provide a method, device, and system for selecting a user plane functional entity supporting non-3GPP access, to resolve at least an existing problem that, when UE moves from a 3GPP network to a non-3GPP network for access, service continuity cannot be ensured because a previously selected UP functional entity may no longer be suitable to continue serving the UE.

To achieve the foregoing objective, the embodiments of the present application provide the following technical solutions:

In at least one embodiment, a method for selecting a UP functional entity supporting non-3GPP access is provided, where the method includes: when UE performs access via a 3GPP network, obtaining, by a CP functional entity, subscription data of the UE, where the subscription data includes indication information that indicates whether the UE is allowed to connect to a non-3GPP network; and if the indication information indicates that the UE is allowed to connect to the non-3GPP network, selecting, by the CP functional entity, a target UP functional entity supporting non-3GPP access. In other words, when selecting the target UP functional entity supporting non-3GPP access, the CP functional entity considers whether the UE is allowed to connect to the non-3GPP network, and when the UE is allowed to connect to the non-3GPP network, the CP functional entity selects the target UP functional entity supporting non-3GPP access. An interface NG3 shown in FIG. 1 exists between the target UP functional entity supporting non-3GPP access and a non-3GPP gateway. Therefore, when the UE moves from the 3GPP network to the non-3GPP network for access, the target UP functional entity is still suitable to continue serving the UE, thereby ensuring service continuity.

In a possible design, the selecting, by the CP functional entity, a target UP functional entity supporting non-3GPP access includes: obtaining, by the CP functional entity, a non-3GPP access capability of at least one UP functional entity; and selecting, by the CP functional entity from the at least one UP functional entity based on the non-3GPP access capability of the at least one UP functional entity, the target UP functional entity supporting non-3GPP access. In other words, the CP functional entity may select, based on the subscription data and a non-3GPP access capability of a UP functional entity, the target UP functional entity supporting non-3GPP access.

In a possible design, that the subscription data includes indication information that indicates whether the UE is allowed to connect to a non-3GPP network includes: the subscription data includes a network access mode parameter, and if the network access mode parameter is set to a packet switched domain or if the network access mode parameter is set to a packet switched domain or a circuit switched domain, it indicates that the UE is allowed to connect to the non-3GPP network, or if the network access mode parameter is set to a circuit switched domain, it indicates that the UE is not allowed to connect to the non-3GPP network; or if the subscription data includes a non-3GPP allowed indication, it indicates that the UE is allowed to connect to the non-3GPP network, or if the subscription data excludes a non-3GPP allowed indication, it indicates that the UE is not allowed to connect to the non-3GPP network; or if the subscription data includes a non-3GPP not allowed indication, it indicates that the UE is not allowed to connect to the non-3GPP network, or if the subscription data excludes a non-3GPP not allowed indication, it indicates that the UE is allowed to connect to the non-3GPP network.

In a possible design, the non-3GPP access capability of the at least one UP functional entity includes: at least one of the following: an indication that the UP functional entity supports an Internet Protocol Security IPsec connection, an indication that the UP functional entity supports an interface between the UP functional entity and a non-3GPP gateway, an indication that the UP functional entity is integrated with a non-3GPP gateway, or an indication that the UP functional entity supports a Point-to-Point Protocol over Ethernet PPPOE.

In a possible design, the obtaining, by the CP functional entity, a non-3GPP access capability of at least one UP functional entity includes: obtaining, by the CP functional entity through domain name system DNS query, the non-3GPP access capability of the at least one UP functional entity; or obtaining, by the CP functional entity, the configured non-3GPP access capability of the at least one UP functional entity, where when each of the at least one UP functional entity establishes a connection to the CP functional entity, the CP functional entity receives a connection establishment request message sent by the UP functional entity, where the connection establishment request message carries a non-3GPP access capability of the UP functional entity. In other words, the CP functional entity may obtain the non-3GPP access capability of the at least one UP functional entity in the foregoing manners.

In a possible design, before the selecting, by the CP functional entity from the at least one UP functional entity based on the non-3GPP access capability of the at least one UP functional entity, the target UP functional entity supporting non-3GPP access, the method further includes: obtaining, by the CP functional entity, a non-3GPP access capability of the UE; and the selecting, by the CP functional entity from the at least one UP functional entity based on the non-3GPP access capability of the at least one UP functional entity, the target UP functional entity supporting non-3GPP access includes: if the non-3GPP access capability of the UE represents that the UE is UE supporting non-3GPP access, selecting, by the CP functional entity from the at least one UP functional entity based on the non-3GPP access capability of the at least one UP functional entity, the target UP functional entity supporting non-3GPP access. In other words, when selecting the target UP functional entity supporting non-3GPP access, the CP functional entity not only considers whether the UE is allowed to connect to the non-3GPP network, but also considers the non-3GPP access capability of the UE. When the UE is allowed to connect to the non-3GPP network, if the non-3GPP access capability of the UE represents that the UE is UE supporting non-3GPP access, the CP functional entity selects, based on the non-3GPP access capability of the UP functional entity, the target UP functional entity supporting non-3GPP access.

In a possible design, the non-3GPP access capability of the UE includes at least one of the following: that the UE supports multiple access, that the UE supports Wireless Fidelity Wi-Fi access, that the UE supports an IPsec connection, that the UE supports fixed network access, that the UE supports unlicensed spectrum access, or that the UE supports a PPPOE.

In a possible design, after the selecting, by the CP functional entity, a target UP functional entity supporting non-3GPP access, the method further includes: when the UE performs access via the non-3GPP network, receiving, by the CP functional entity, non-access stratum NAS signaling sent by the UE, where the NAS signaling carries a packet data unit PDU session establishment request message; sending, by the CP functional entity, the PDU session establishment request message to the target UP functional entity; receiving, by the CP functional entity, a PDU session establishment response message sent by the target UP functional entity, where the PDU session establishment response message carries a fully qualified tunnel endpoint identifier F-TEID of the target UP functional entity that is assigned by the target UP functional entity, and the F-TEID of the target UP functional entity includes an Internet Protocol IP address of the target UP functional entity and a tunnel endpoint identifier TEID of the target UP functional entity; sending, by the CP functional entity, the F-TEID of the target UP functional entity to the non-3GPP gateway N3G-GW; receiving, by the CP functional entity, an F-TEID of the N3G-GW that is assigned by the N3G-GW, where the F-TEID of the N3G-GW includes an IP address of the N3G-GW and a TEID of the N3G-GW; and sending, by the CP functional entity, the F-TEID of the N3G-GW to the target UP functional entity. In this way, the target UP functional entity can learn of the F-TEID of the N3G-GW, and the N3G-GW can learn of the F-TEID of the target UP functional entity, so that a session connection can be established between the N3G-GW and the target UP.

In a possible design, the IP address of the target UP functional entity and the IP address of the N3G-GW are device-granularity IP addresses, and the TEID of the target UP functional entity and the TEID of the N3G-GW are device-granularity TEIDs; or the IP address of the target UP functional entity and the IP address of the N3G-GW are session-granularity IP addresses, and the TEID of the target UP functional entity and the TEID of the N3G-GW are session-granularity TEIDs. In other words, the F-TEID in this application of the present application may be a device-granularity F-TEID or may be a session-granularity F-TEID.

In a possible design, after the selecting, by the CP functional entity, a target UP functional entity supporting non-3GPP access, and before the UE performs access via the non-3GPP network, the method further includes: selecting, by the CP functional entity, a target N3G-GW for the UE based on at least one condition such as a location of the UE, an indication of whether the N3G-GW is integrated with the target UP functional entity, or a load status of the N3G-GW; and sending, by the CP functional entity, an identifier of the target N3G-GW to the UE. In other words, when the UE performs access via the 3GPP network, the target N3G-GW is further selected for the UE based on the at least one condition such as the location of the UE, whether the N3G-GW is integrated with the target UP functional entity, or the load status of the N3G-GW, so that an N3G-GW that has relatively low load and that is relatively close to the UE can be obtained.

In a possible design, after the selecting, by the CP functional entity, a target UP functional entity supporting non-3GPP access, and before the UE performs access via the non-3GPP network, the method further includes: sending, by the CP functional entity, an identifier of the target UP functional entity to the UE, where the identifier of the target UP functional entity is used by the UE to choose to integrate with the target UP functional entity or select a target N3G-GW whose physical location is closest to that of the target UP functional entity. In other words, when the UE performs access via the 3GPP network, the target N3G-GW is further selected for the UE based on the at least one condition such as the location of the UE, whether the N3G-GW is integrated with the target UP functional entity, or the load status of the N3G-GW, so that an N3G-GW that has relatively low load and that is relatively close to the UE can be obtained.

In a possible design, after the selecting, by the CP functional entity, a target UP functional entity supporting non-3GPP access, the method further includes: when the UE performs access via the non-3GPP network, selecting, by the CP functional entity, a target N3G-GW for the UE based on at least one condition such as a location of the UE, whether the N3G-GW is integrated with the target UP functional entity, or a load status of the N3G-GW; and sending, by the CP functional entity, an identifier of the target N3G-GW to the UE by using an initial N3G-GW connected to the UE. In other words, after the UE is connected to the non-3GPP network, the CP functional entity may further perform N3G-GW reselection and notify the UE of the identifier of the reselected target N3G-GW. The UE disconnects from the previous N3G-GW and initiates a procedure of establishing an IPsec connection to the target N3G-GW. The reselected target N3G-GW is selected based on the at least one condition such as the location of the UE, whether the N3G-GW is integrated with the target UP functional entity, or the load status of the N3G-GW, so that an N3G-GW that has relatively low load and that is relatively close to the UE can be obtained. That is, the UE can establish an IPsec connection to the N3G-GW that has relatively low load and that is relatively close to the UE.

At least one embodiment of the present application provides a CP functional entity, where the CP functional entity has functions of implementing behavior of the CP functional entity in the foregoing method embodiment. The functions may be implemented by hardware, or may be implemented by executing corresponding software by hardware. The hardware or software includes one or more modules corresponding to the functions.

At least one embodiment of the present application provides a CP functional entity, including a processor, a memory, a bus, and a commutations interface, where the memory is configured to store a computer executable instruction; the processor is connected to the memory by using the bus; and when the CP functional entity runs, the processor executes the computer executable instruction stored in the memory, so that the CP functional entity performs the method for selecting a UP functional entity supporting non-3GPP access according to any one of the first aspect or the possible designs of the first aspect.

At least one embodiment of the present application provides a computer storage medium, configured to store a computer software instruction for use by the foregoing CP functional entity, where the computer software instruction includes a program designed for the CP functional entity to execute the foregoing embodiments.

In addition, for technical effects brought by any one of design manners of the at least one embodiment, reference may be made to the technical effects brought by other design manners, and details are not described herein again.

Embodiments of the present application are more concise and comprehensible in descriptions of the following embodiments.

BRIEF DESCRIPTION OF DRAWINGS

To describe the technical solutions in the embodiments of the present application more clearly, the following briefly describes the accompanying drawings required for describing the embodiments. Apparently, the accompanying drawings in the following descriptions show merely some embodiments of the present application, and a person of ordinary skill in the art may derive other drawings from these accompanying drawings.

DESCRIPTION OF EMBODIMENTS

The following describes the technical solutions in the embodiments of the present application with reference to the accompanying drawings in the embodiments of the present application. Apparently, the described embodiments are merely some rather than all of the embodiments of the present application.

In addition, in the descriptions of the present application, unless otherwise specified, "a plurality of" means two or more.

Figure 1:
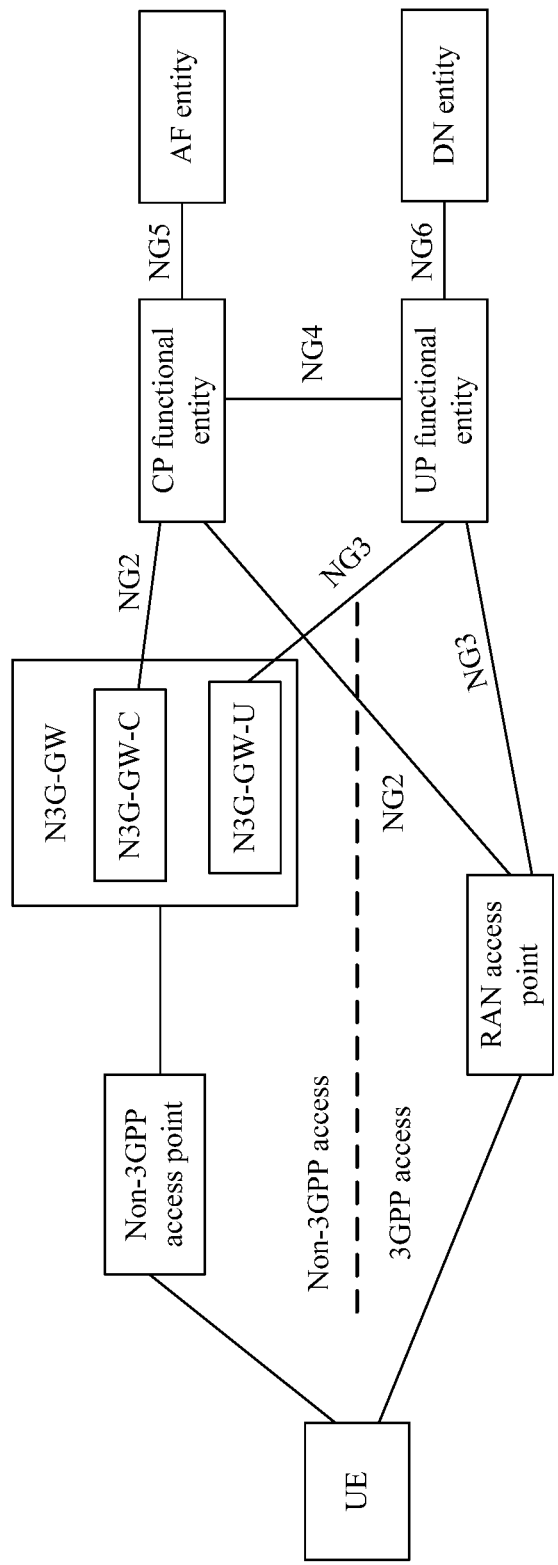
FIG. 1 is a schematic diagram of a 5G network architecture according to an embodiment of the present application.

FIG. 1 shows a 5G network architecture according to an embodiment of the present application. The architecture not only supports accessing a 5G core network by using wireless technologies defined by the 3GPP specifications groups, but also supports accessing the 5G core network by using non-3GPP access technologies.

As shown in FIG. 1, during access via a 3GPP network, a UE is connected to the 5G core network by using a radio access network (RAN) access point. The RAN access point communicates with a CP functional entity of the 5G core network through a network interface, namely, next generation (NG) 2 and communicates with a UP functional entity of the 5G core network through an NG3. During access via a non-3GPP network, the UE is connected to the 5G core network by using a non-3GPP gateway (N3G-GW). The N3G-GW includes an N3G-GW control plane (N3G-GW-C) and an N3G-GW user plane (N3G-GW-U). The N3G-GW-C communicates with the CP functional entity of the 5G core network through the NG2. The N3G-GW-U communicates with the UP functional entity of the 5G core network through the NG3.

In addition, the CP functional entity communicates with an application function (AF) entity of the 5G core network through an NG5 and delivers a packet forwarding policy, a QoS control policy, and the like to the UP functional entity through an NG4. The UP functional entity communicates with a data network (DN) entity of the 5G core network through an NG6 and is responsible for packet forwarding, QoS control, charging information statistics collection, and the like.

Although not shown, the 5G network architecture may further include a home subscriber server (HSS). The HSS is a master subscriber database used to support an Internet Protocol (IP) multimedia subsystem (IMS) network entity that processes or calls a session. The database contains subscriber profiles, performs authentication and authorization of subscribers, and may provide information about a physical location of a subscriber. The database is similar to a Global System for Mobile Communications (GSM) home location register. Functions provided by the HSS include an IP multimedia function, a packet switched (PS) domain required home location register (HLR) function, and a circuit switched (CS) domain required HLR function. Information that can be processed by the HSS includes subscriber identity, numbering, and address information; subscriber security information, to be specific, network access control information for authentication and authorization; subscriber positioning information, to be specific, HSS supported subscriber registration and storage location information; subscriber list information; and the like. In this embodiment of the present application, the HSS is mainly configured to provide subscription data of the UE when the UE performs access via the 3GPP network, so that the CP functional entity determines, based on the subscription data, whether the UE is allowed to connect to the non-3GPP network.

Certainly, the 5G network architecture may further include other modules or network entities. This is not specifically limited in this embodiment of the present application.

It should be noted that the UE in this application may include various handheld devices with a wireless communication function, various in-vehicle devices, various wearable devices, various computing devices, or other processing devices connected to a wireless modem, and various forms of UEs, mobile stations (MS), terminals, terminal equipments, soft terminals, or the like. For ease of description, in this application, the devices mentioned above are collectively referred to as user equipment or UE.

It should be noted that the foregoing "CP functional entity" and "UP functional entity" are only names, and names impose no limitations on devices. For example, the "CP functional entity" may be substituted with a "CP function", and the "UP functional entity" may be substituted with a "UP function". Alternatively, the "CP functional entity" may be substituted with a "CP", and the "UP functional entity" may be substituted with a "UP"; or the like. A general explanation is provided herein and no more details are described below.

In addition, any one functional node or network element in the 5G network architecture, for example, the CP functional entity or the UP functional entity, may be implemented by one entity device or may be jointly implemented by a plurality of entity devices. A plurality of functional nodes or network elements in the 5G network architecture, for example, the CP functional entity and the UP functional entity, may be implemented by different entity devices or may be implemented by a same entity device. This is not specifically limited in this embodiment of the present application. To be specific, it can be understood that any one functional node or network element in the 5G network architecture, for example, the CP functional entity or the UP functional entity, may be a logical function module in one entity device or may be a logical function module including a plurality of entity devices. This is not specifically limited in this embodiment of the present application.

Figure 2:
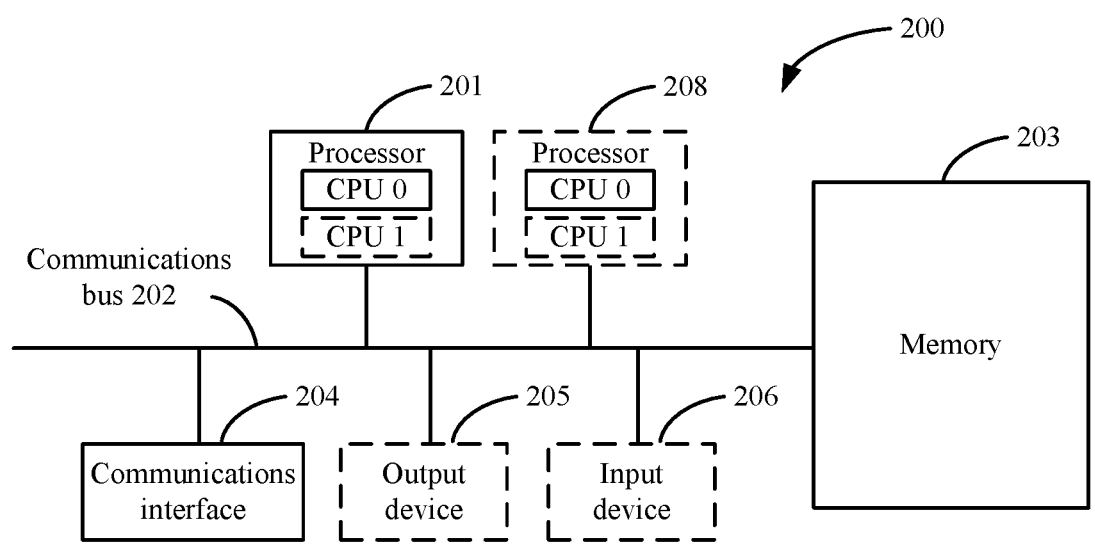
FIG. 2 is a schematic diagram of a computer device according to an embodiment of the present application.

For example, as shown in FIG. 2, the CP functional entity in FIG. 1 may be implemented by a computer device (or system) in FIG. 2.

FIG. 2 is a schematic diagram of a computer device according to an embodiment of the present application. The computer device 200 includes at least one processor 201, a communications bus 202, a memory 203, and at least one communications interface 204.

The processor 201 may be a general-purpose central processing unit (CPU), a microprocessor, an application-specific integrated circuit (ASIC), or one or more integrated circuits for controlling execution of a program of solutions of the present application.

The communications bus 202 may include a path for transferring information between the foregoing components.

The communications interface 204 is configured to communicate, by using any apparatuses such as a transceiver, with another device or a communications network such as an Ethernet network, a radio access network (RAN), or a wireless local area network (WLAN).

The memory 203 may be but is not limited to a read-only memory (ROM) or other types of static storage devices that can store static information and instructions, or a random access memory (RAM) or other types of dynamic storage devices that can store information and instructions, or may be an electrically erasable programmable read-only memory (EEPROM), a compact disc read-only memory (CD-ROM) or other optical disc storages, an optical disc storage (including a compact disc, a laser disc, an optical disc, a digital versatile disc, a Blu-ray disc, or the like), a magnetic disk storage medium or other magnetic storage devices, or any other media that can be used to carry or store expected program code in a form of an instruction or a data structure and that can be accessed by a computer. The memory may exist independently, and is connected to the processor by using the bus. The memory may alternatively be integrated with the processor.

The memory 203 is configured to store application program code for executing the solutions of the present application, and the processor 201 controls the execution. The processor 201 is configured to execute the application program code stored in the memory 203, so as to implement selection of a UP functional entity supporting non-3GPP access.

During specific implementation, in an embodiment, the processor 201 may include one or more CPUs, for example, a CPU 0 and a CPU 1 in FIG. 2.

During specific implementation, in an embodiment, the computer device 200 may include a plurality of processors, for example, the processor 201 and a processor 208 in FIG. 2. Each of the processors may be a single-core (single-CPU) processor, or may be a multi-core (multi-CPU) processor. The processor herein may be one or more devices, circuits, and/or processing cores for processing data (for example, computer program instructions).

During specific implementation, in an embodiment, the computer device 200 may further include an output device 205 and an input device 206. The output device 205 communicates with the processor 201, and may display information in a plurality of manners. For example, the output device 205 may be a liquid crystal display (LCD), a light emitting diode (LED) display device, a cathode ray tube (CRT) display device, or a projector. The input device 206 communicates with the processor 201, and may receive a user input in a plurality of manners. For example, the input device 206 may be a mouse, a keyboard, a touchscreen device, or a sensor device.

The computer device 200 may be a general-purpose computer device or a special-purpose computer device. During specific implementation, the computer device 200 may be a desktop computer, a portable computer, a network server, a personal digital assistant (PDA), a mobile phone, a tablet computer, a wireless terminal device, a communications device, an embedded device, or a device with a structure similar to that in FIG. 2. A type of the computer device 200 is not limited in this embodiment of the present application.

Figure 3A:
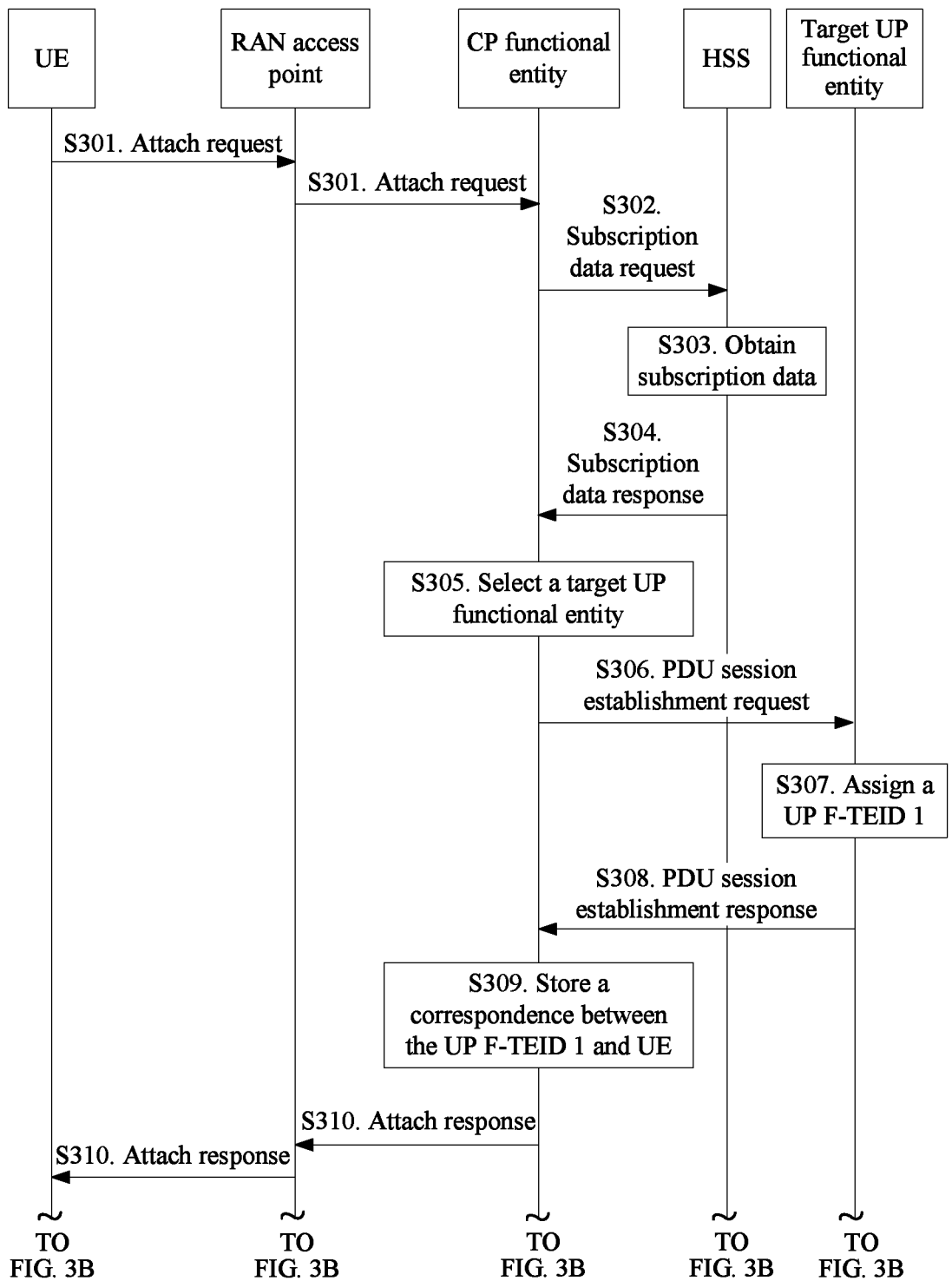
FIG. 3A and FIG. 3B show a schematic flowchart of a method for selecting a UP functional entity supporting non-3GPP access according to an embodiment of the present application.
Figure 3B:
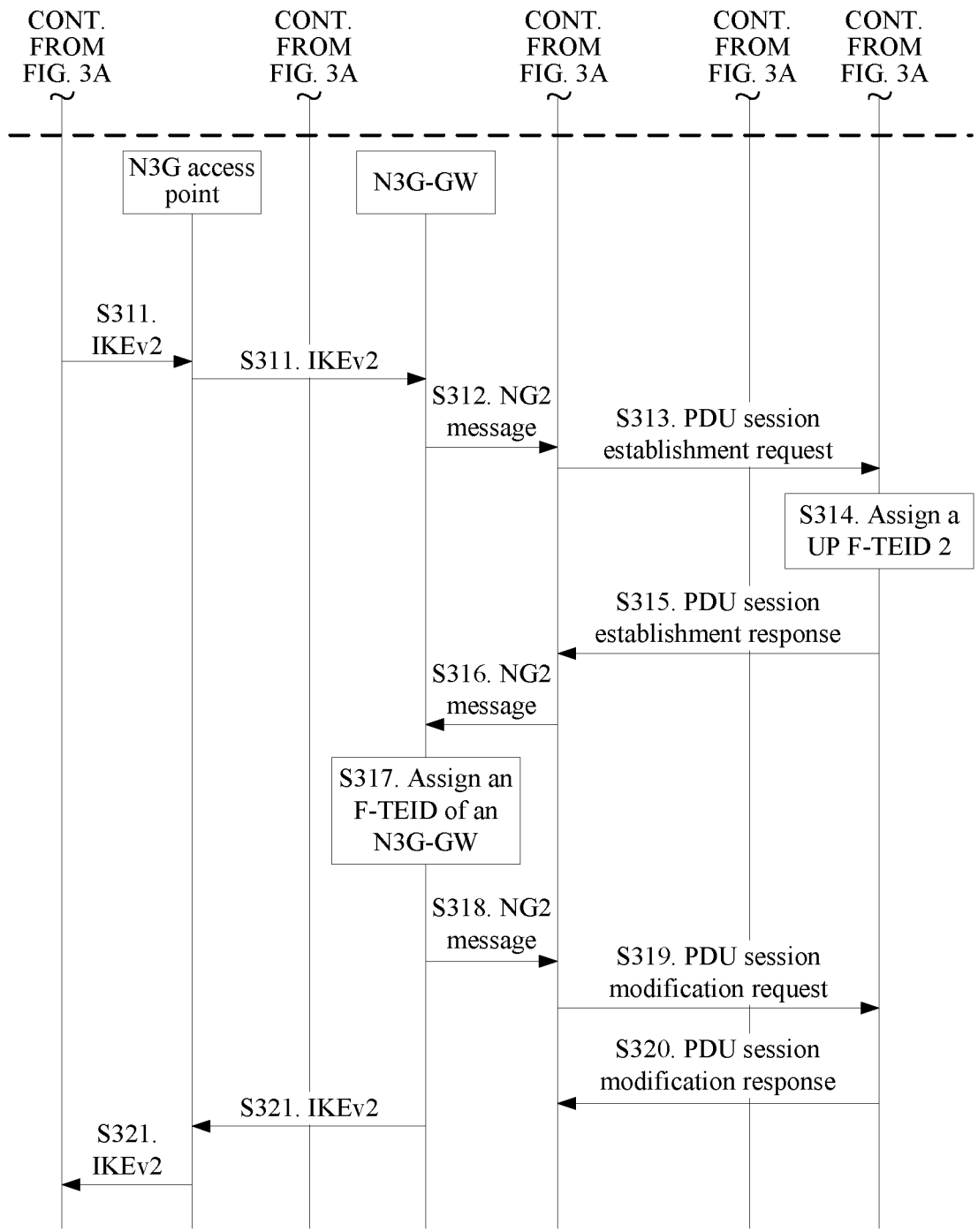

FIG. 3A and FIG. 3B are a schematic flowchart of a method for selecting a UP functional entity supporting non-3GPP access according to an embodiment of the present application. The method is described by using an example in which UE performs access via the 3GPP network in the 5G network architecture shown in FIG. 1, and relates to interaction between the UE, the RAN access point, the UP functional entity, the CP functional entity, and the HSS. The method includes the following operations S301 to S310.

S301. The UE establishes a connection to the RAN access point and sends an attach request message to the CP functional entity by using the RAN access point, so that the CP functional entity receives the attach request message.

The attach request message includes a UE identifier such as a temporary UE identifier or a permanent UE identifier. For example, the permanent UE identifier may be an international mobile subscriber identity (IMSI).

Optionally, the attach request message may further include at least one of a non-3GPP access capability of the UE or a connection type indication. The non-3GPP access capability includes:

at least one of the following: that the UE supports multiple access, that the UE supports Wireless Fidelity (Wi-Fi) access, that the UE supports an IP Security (IPSec) connection, that the UE supports fixed network access, that the UE supports unlicensed spectrum access, or that the UE supports a Point-to-Point Protocol over Ethernet (PPPOE).

The connection type indication includes:

at least one of an indication that the UE is to initiate non-3GPP access subsequently or an indication that this connection is a multi-connection.

S302. The CP functional entity sends a subscription data request to the HSS, so that the HSS receives the subscription data request.

The subscription data request may be a subscription data obtaining message or an update location request message. This is not specifically limited in this embodiment of the present application. The foregoing message includes the permanent UE identifier. The permanent UE identifier may be carried in the attach request message in operation S301 or may be obtained based on the temporary UE identifier carried in the attach request message in operation S301. This is not specifically limited in this embodiment of the present application. Optionally, the foregoing message may also carry an identifier of the CP functional entity. This is not specifically limited in this embodiment of the present application.

S303. The HSS obtains subscription data of the UE based on a permanent UE identifier, where the subscription data includes indication information that indicates whether the UE is allowed to connect to a non-3GPP network.

A manner of indicating, in the subscription data, whether the UE is allowed to connect to the non-3GPP network is not specifically limited in this embodiment of the present application. The following three solutions are provided as an example.

Solution 1: The subscription data includes a network access mode parameter. If the network access mode parameter is set to a PS domain, or if the network access mode parameter is set to a PS domain or a CS domain, it indicates that the UE is allowed to connect to the non-3GPP network. If the network access mode parameter is set to a CS domain, it indicates that the UE is not allowed to connect to the non-3GPP network.

Solution 2: If the subscription data includes a non-3GPP allowed indication, it indicates that the UE is allowed to connect to the non-3GPP network. If the subscription data excludes a non-3GPP allowed indication, it indicates that the UE is not allowed to connect to the non-3GPP network.

Solution 3: If the subscription data includes a non-3GPP not allowed indication, it indicates that the UE is not allowed to connect to the non-3GPP network. If the subscription data excludes a non-3GPP not allowed indication, it indicates that the UE is allowed to connect to the non-3GPP network.

Optionally, the non-3GPP allowed indication may be substituted with a non-3GPP authorized indication. This is not specifically limited in this embodiment of the present application.

S304. The HSS sends a subscription data response to the CP functional entity, so that the CP functional entity receives the subscription data response.

If the subscription data request in operation S302 is specifically the subscription data obtaining message, the subscription data response herein may be specifically a subscription data response message. If the subscription data request in operation S302 is the update location request message, the subscription data response herein may be an update location response message. This is not specifically limited in this embodiment of the present application. The foregoing message includes the subscription data.

S305. The CP functional entity selects, based on the subscription data, a target UP functional entity supporting non-3GPP access.

If the indication information that is included in the subscription data and that indicates whether the UE is allowed to connect to the non-3GPP network indicates that the UE is allowed to connect to the non-3GPP network, or if the indication information that is included in the subscription data and that indicates whether the UE is allowed to connect to the non-3GPP network indicates that the UE is allowed to connect to the non-3GPP network and at least one of the following conditions is satisfied, that is, the UE supports non-3GPP access, the UE is to initiate non-3GPP access subsequently, or a multi-access packet data unit (PDU) connection is supported, the CP functional entity selects, from at least one UP functional entity, the target UP functional entity supporting non-3GPP access.

Optionally, when selecting the target UP functional entity supporting non-3GPP access, the CP functional entity further considers at least one of a non-3GPP access capability of a UP functional entity or a user plane type supported by a UP functional entity.

The non-3GPP access capability of the UP functional entity includes:

at least one of the following: that the UP functional entity supports an IPsec connection, that the UP functional entity supports an interface between the UP functional entity and a non-3GPP gateway, that the UP functional entity is integrated with a non-3GPP gateway, or that the UP functional entity supports a PPPOE.

The user plane type supported by the UP functional entity includes:

at least one of a user plane supporting establishment of a device granularity or a user plane supporting establishment of a multi-access PDU session.

A manner of obtaining, by the CP functional entity, at least one of the non-3GPP access capability of the UP functional entity or the user plane type supported by the UP functional entity is not specifically limited in this embodiment of the present application. The following two solutions are provided as an example.

Solution 1: When establishing a connection to the CP functional entity, the UP functional entity reports at least one of the non-3GPP access capability of the UP functional entity or the user plane type supported by the UP functional entity. For example, the UP functional entity sends an Sx setup request message to the CP functional entity. The message includes at least one of the non-3GPP access capability of the UP functional entity or the user plane type supported by the UP functional entity.

Solution 2: The CP functional entity obtains, through domain name system (DNS) query, the non-3GPP access capability of the UP functional entity. For example, in a DNS query process, the DNS system sends, to the CP functional entity, information about an interface supported by the UP functional entity. The information about the interface includes the interface between the UP functional entity and the non-3GPP gateway, such as the NG3 in FIG. 1. Optionally, the DNS sends, to the CP functional entity, the user plane type supported by the UP functional entity.

In addition, optionally, when selecting the target UP functional entity supporting non-3GPP access, the CP functional entity may further consider at least one of a current load status of the UP functional entity, whether the UP functional entity supports a related APN, and location information of the UP functional entity. This is not specifically limited in this embodiment of the present application.

S306. The CP functional entity sends a PDU session establishment request message to the target UP functional entity, so that the target UP functional entity receives the PDU session establishment request message.

S307. The target UP functional entity assigns, to a 3GPP-side PDU connection, a fully qualified tunnel endpoint identifier (F-TEID) of the target UP functional entity, denoted as an F-TEID 1, where the F-TEID 1 includes an IP address of the target UP functional entity and a tunnel endpoint identifier (TEID) of the target UP functional entity.

The F-TEID 1 is used by a device to internally search for a user context and is an identifier of a specific processing board (a board corresponding to the TEID) of a specific device (a device corresponding to the IP address) in which user context information is located. The F-TEID 1 may be a device-granularity F-TEID, to be specific, the IP address of the target UP functional entity is a device-granularity IP address and the TEID of the target UP functional entity is a device-granularity TEID. The F-TEID 1 may alternatively be a session-granularity F-TEID, to be specific, the IP address of the target UP functional entity is a session-granularity IP address and the TEID of the target UP functional entity is a session-granularity TEID. This is not specifically limited in this embodiment of the present application.

It should be noted that a purpose of denoting, as the F-TEID 1, the F-TEID of the target UP functional entity assigned by the target UP functional entity to the 3GPP-side PDU connection herein is to distinguish the F-TEID from an F-TEID of the target UP functional entity assigned by the target UP functional entity to a non-3GPP-side PDU connection below. A general explanation is provided herein and is applicable to all the following embodiments. No more details are described below.

S308. The target UP functional entity sends a PDU session establishment response message to the CP functional entity, where the PDU session establishment response carries the F-TEID 1, so that the CP functional entity receives the PDU session establishment response message.

S309. The CP functional entity stores a correspondence between the F-TEID 1 and the UE, so that the UE obtains the F-TEID 1 based on the correspondence in a subsequent 3GPP session or another 3GPP procedure.

S310. The CP functional entity sends an attach response message to the UE by using the RAN access point, so that the UE receives the attach response message.

This is the end of a process in which the UE performs access via the 3GPP network in the 5G network architecture shown in FIG. 1 and establishes a PDU session.

In the foregoing process, when selecting the target UP functional entity supporting non-3GPP access, the CP functional entity considers whether the UE is allowed to connect to the non-3GPP network, and when the UE is allowed to connect to the non-3GPP network, the CP functional entity selects the target UP functional entity supporting non-3GPP access. The interface NG3 shown in FIG. 1 exists between the target UP functional entity supporting non-3GPP access and the non-3GPP gateway. Therefore, when the UE moves from the 3GPP network to the non-3GPP network for access, the target UP functional entity is still suitable to continue serving the UE, thereby ensuring service continuity.

Actions of the CP functional entity in operations S302, S305, S306, S309, and S310 may be performed by the processor 201 in the computer device 200 shown in FIG. 2, by invoking the application program code stored in the memory 203. This is not limited in this embodiment of the present application.

Optionally, after operation S310, the UE may further initiate a non-3GPP access and PDU session establishment process in the 5G network architecture shown in FIG. 1. The process relates to interaction between the UE, an N3G access point, the N3G-GW, the UP functional entity, and the CP functional entity. The UP functional entity in the process is the target UP functional entity selected in the foregoing case of 3GPP access. The process includes the following operations S311 and S321.

S311. The UE establishes a connection to the N3G access point, and establishes an IPsec connection to the N3G-GW after obtaining an identifier of the N3G-GW or an IP address of the N3G-GW.

The N3G access point may be, for example, a Wi-Fi access point (AP) or a Wi-Fi access controller (AC).

For example, the identifier of the N3G-GW or the IP address of the N3G-GW may be obtained through DNS query.

That the UE establishes an IPsec connection to the N3G-GW may be, for example, that the UE sends an IKEv2 message to the N3G-GW by using the N3G access point. The IKEv2 message may be an Internet Key Exchange_authentication IKE_AUTH (internet key exchange_authenticationIKE_AUTH) message. The IKE_AUTH message may carry non-access stratum (NAS) signaling or Extensible Authentication Protocol (EAP) signaling. This is not specifically limited in this embodiment of the present application. The following operations in this embodiment of the present application are described by using an example in which the IKE_AUTH message may carry the NAS signaling.

S312. The N3G-GW obtains the NAS signaling in operation S311 and sends the NAS signaling to the CP functional entity by using a message of the interface NG2 between the N3G-GW and the CP functional entity shown in FIG. 1, so that the CP functional entity receives the NAS signaling.

The NAS signaling may include, for example, the PDU session establishment request message.

S313. The CP functional entity parses the NAS signaling to obtain the PDU session establishment request message and sends the PDU session establishment request message to the target UP functional entity, so that the target UP functional entity receives the PDU session establishment request message.

The target UP functional entity is the UP functional entity selected when the UE performs access via the 3GPP network in the foregoing embodiment. An identifier of the UP functional entity and a correspondence between the UP functional entity and an APN corresponding to the UP functional entity may be prestored in the CP functional entity. When there are a plurality of UP functional entities serving the UE, and if different APNs are corresponding to different UP functional entities, the UE needs to select a corresponding UP functional entity based on a current APN of the UE.

S314. The target UP functional entity assigns an F-TEID of the target UP functional entity to a non-3GPP-side PDU connection, denoted as an F-TEID 2, where the F-TEID 2 includes the IP address of the target UP functional entity and the TEID of the target UP functional entity.

The F-TEID 2 is used by a device to internally search for a user context and is an identifier of a specific processing board (a board corresponding to the TEID) of a specific device (a device corresponding to the IP address) in which user context information is located. The F-TEID 2 may be a device-granularity F-TEID, to be specific, the IP address of the target UP functional entity is a device-granularity IP address and the TEID of the target UP functional entity is a device-granularity TEID. The F-TEID 2 may alternatively be a session-granularity F-TEID, to be specific, the IP address of the target UP functional entity is a session-granularity IP address and the TEID of the target UP functional entity is a session-granularity TEID. This is not specifically limited in this embodiment of the present application.

It should be noted that a purpose of denoting, as the F-TEID 2, the F-TEID of the target UP functional entity assigned by the target UP functional entity to the non-3GPP-side PDU connection herein is to distinguish the F-TEID from the F-TEID of the target UP functional entity assigned by the target UP functional entity to the 3GPP-side PDU connection above. A general explanation is provided herein and is applicable to all the following embodiments. No more details are described below.

The F-TEID 1 and the F-TEID 2 in this embodiment of the present application may be the same or may be different. This is not specifically limited in this embodiment of the present application.

S315. The target UP functional entity sends a PDU session establishment response message to the CP functional entity, where the PDU session establishment response carries the F-TEID 2, so that the CP functional entity receives the PDU session establishment response message.

S316. The CP functional entity sends the F-TEID 2 to the N3G-GW by using a message of the interface NG2 shown in FIG. 1.

The message of the interface NG2 is, for example, a connection establishment request message or an NG2 message. In addition, the CP functional entity may further send, to the N3G-GW by using the message of the interface NG2 between the CP functional entity and the N3G-GW shown in FIG. 1, the NAS signaling sent to the UE. The NAS signaling may include, for example, the PDU session establishment response message.

S317. The N3G-GW stores a correspondence between the F-TEID 2 and the UE, so that the UE obtains the F-TEID 2 based on the correspondence in a subsequent non-3GPP session or another non-3GPP procedure. In addition, the N3G-GW assigns an F-TEID of the N3G-GW, where the F-TEID of the N3G-GW includes the IP address of the N3G-GW and a TEID of the N3G-GW.

The F-TEID of the N3G-GW is used by a device to internally search for a user context and is an identifier of a specific processing board (a board corresponding to the TEID) of a specific device (a device corresponding to the IP address) in which user context information is located. The F-TEID of the N3G-GW may be a device-granularity F-TEID, to be specific, the IP address of the N3G-GW is a device-granularity IP address and the TEID of the N3G-GW is a device-granularity TEID. The F-TEID of the N3G-GW may alternatively be a session-granularity F-TEID, to be specific, the IP address of the N3G-GW is a session-granularity IP address and the TEID of the N3G-GW is a session-granularity TEID. This is not specifically limited in this embodiment of the present application.

S318. The N3G-GW sends the F-TEID of the N3G-GW to the CP functional entity by using a message of the interface NG2 shown in FIG. 1, so that the CP functional entity receives the F-TEID of the N3G-GW.

The message of the interface NG2 may be, for example, a connection establishment response message or an NG2 message.

S319. The CP functional entity sends a PDU session modification request message to the target UP functional entity, where the PDU session modification request message carries the F-TEID of the N3G-GW, so that the target UP functional entity receives the PDU session modification request message.

After obtaining the F-TEID of the N3G-GW, the target UP functional entity may store a correspondence between the F-TEID of the N3G-G and the UE, so that the UE obtains the F-TEID of the N3G-G based on the correspondence in a subsequent non-3GPP session or another non-3GPP procedure. This is not specifically limited in this embodiment of the present application.

After the operations S315 to S319 are performed, the target UP functional entity can learn of the F-TEID of the N3G-GW, and the N3G-GW can learn of the F-TEID 2 of the target UP functional entity, so that a session connection can be established between the N3G-GW and the target UP.

S320. The target UP functional entity sends a PDU session modification response message to the CP functional entity, so that the CP functional entity receives the PDU session modification response message.

S321. The N3G-GW sends, to the UE by using an IKEv2 message, the NAS signaling that is sent by the CP functional entity and that is received in operation S316, so that the UE receives the IKEv2 message.

To be specific, the N3G-GW encapsulates the NAS signaling into the IKEv2 message and sends the IKEv2 message to the UE.

It should be noted that a sequence of operation S317 and operation S321 is not specifically limited in this embodiment of the present application. Specifically, operation S317 may be performed before operation S321; or operation S321 may be performed before operation S317; or operation S317 and operation S321 may be performed simultaneously. This is not specifically limited in this embodiment of the present application.

This is the end of the process in which the UE performs access via the non-3GPP network in the 5G network architecture shown in FIG. 1 and establishes a PDU session.

The UP functional entity in the foregoing process is the target UP functional entity selected in the foregoing case of 3GPP access. In the foregoing case of 3GPP access, when selecting the target UP functional entity supporting non-3GPP access, the CP functional entity considers whether the UE is allowed to connect to the non-3GPP network. When the UE is allowed to connect to the non-3GPP network, the CP functional entity selects the target UP functional entity supporting non-3GPP access. The interface NG3 shown in FIG. 1 exists between the target UP functional entity supporting non-3GPP access and the non-3GPP gateway. Therefore, when the UE moves from the 3GPP network to the non-3GPP network for access, the target UP functional entity is still suitable to continue serving the UE, thereby ensuring service continuity.

Actions of the CP functional entity in operations S313, S316, and S319 may be performed by the processor 201 in the computer device 200 shown in FIG. 2, by invoking the application program code stored in the memory 203. This is not limited in this embodiment of the present application.

Figure 4A:
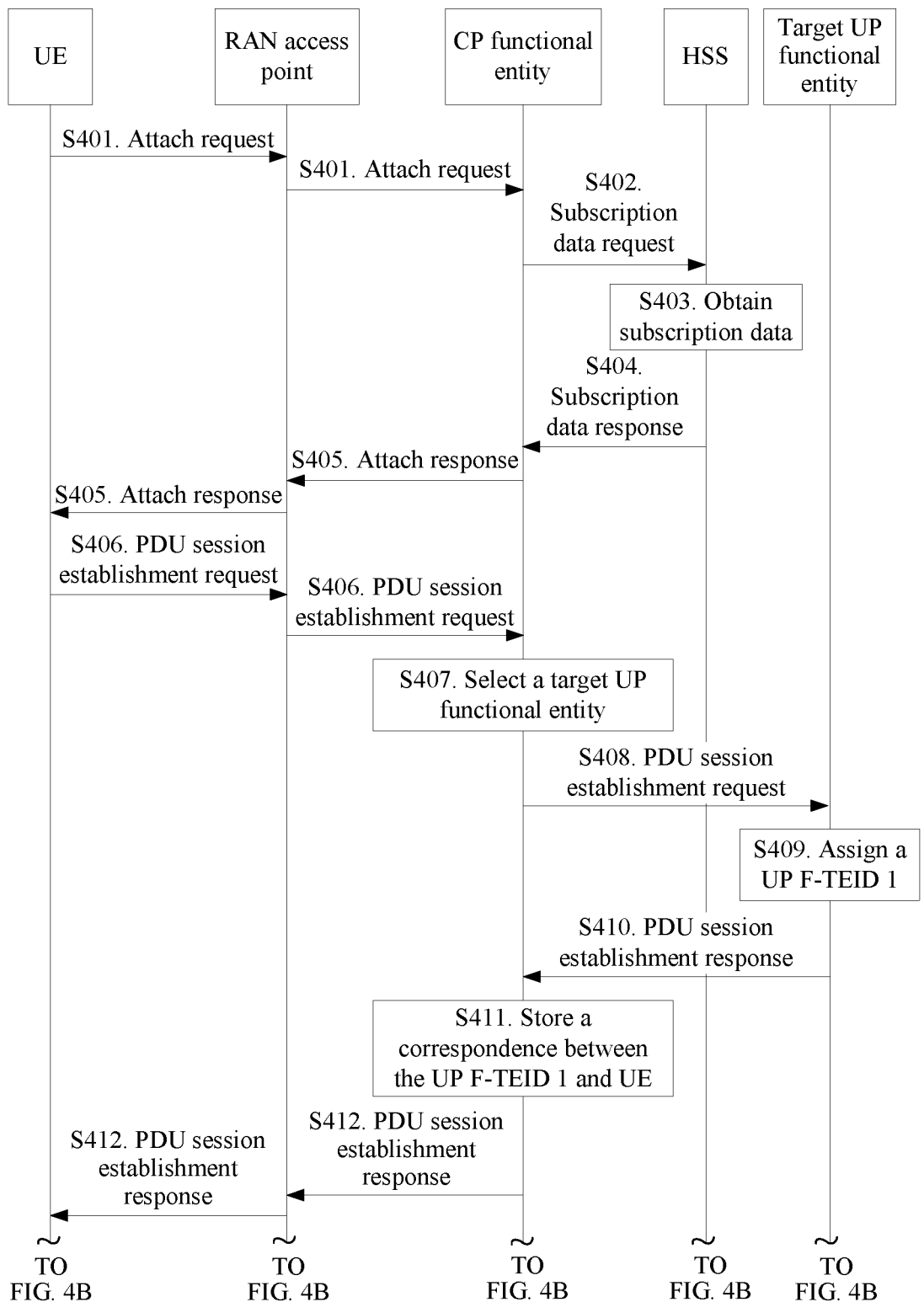
FIG. 4A and FIG. 4B show a schematic flowchart of another method for selecting a UP functional entity supporting non-3GPP access according to an embodiment of the present application.
Figure 4B:
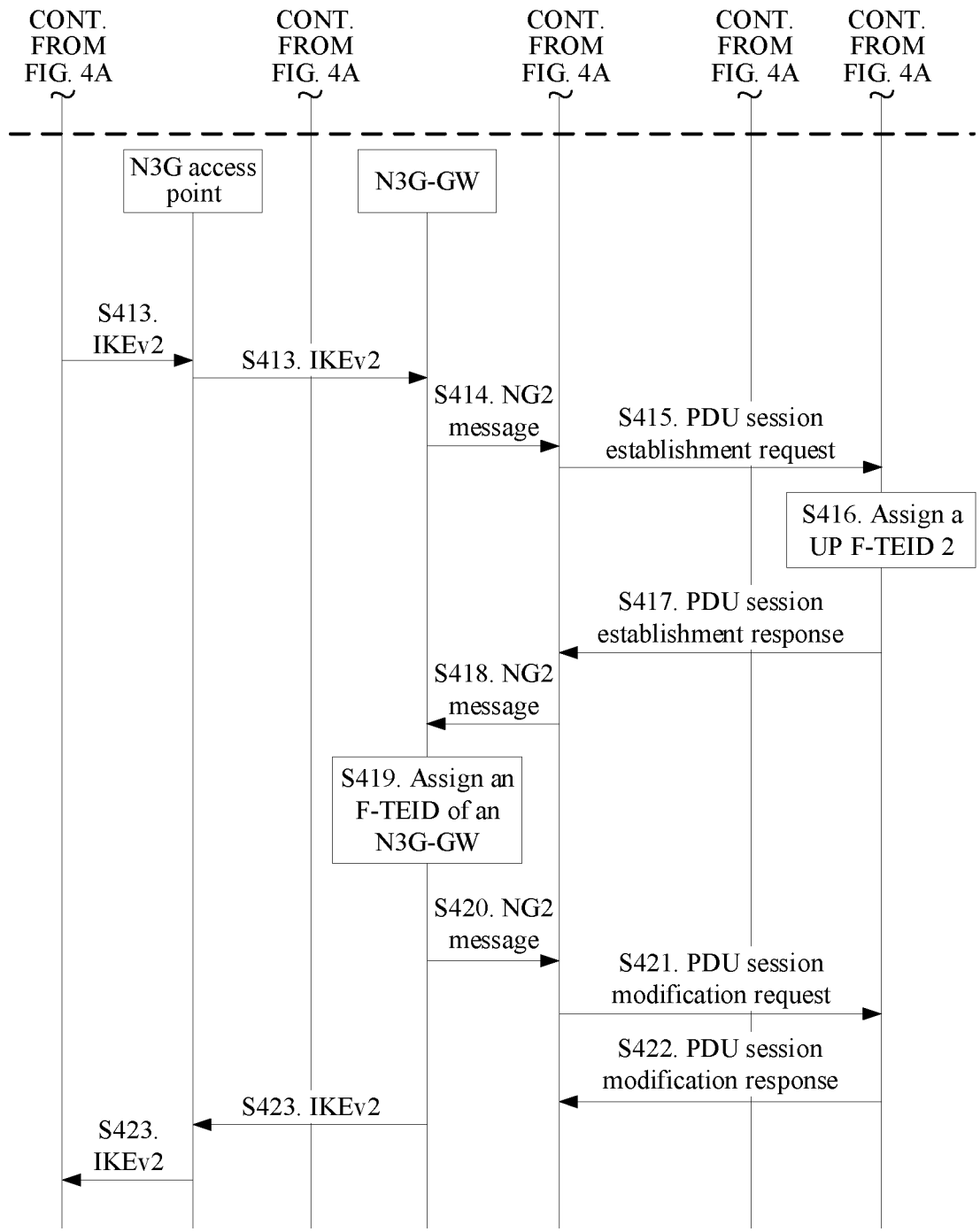

In another possible implementation, FIG. 4A and FIG. 4B are a schematic flowchart of another method for selecting a UP functional entity supporting non-3GPP access according to an embodiment of the present application. The method is described by using an example in which UE performs access via the 3GPP network in the 5G network architecture shown in FIG. 1, and relates to interaction between the UE, the RAN access point, the UP functional entity, the CP functional entity, and the HSS. The method includes the following operations S401 to S412.

Operations S401 to S404 are the same as operations S301 to S304.

Operation S405 is the same as operation S310.

S406. The UE sends a PDU session establishment request message to the CP functional entity by using the RAN access point, so that the CP functional entity receives the PDU session establishment request message.

Optionally, if the attach request message in operation S401 does not carry at least one of a non-3GPP access capability of the UE or a connection type indication, the PDU session establishment request message may carry at least one of the non-3GPP access capability of the UE or the connection type indication.

Operation S407 is the same as operation S305.

Operations S408 to S411 are the same as operations S306 to S309.

S412. The CP functional entity sends a PDU session establishment response message to the UE by using the RAN access point, so that the CP functional entity receives the PDU session establishment response message.

This is the end of a process in which the UE performs access via the 3GPP network in the 5G network architecture shown in FIG. 1 and establishes a PDU session.

In the foregoing process, when selecting the target UP functional entity supporting non-3GPP access, the CP functional entity considers whether the UE is allowed to connect to the non-3GPP network, and when the UE is allowed to connect to the non-3GPP network, the CP functional entity selects the target UP functional entity supporting non-3GPP access. The interface NG3 shown in FIG. 1 exists between the target UP functional entity supporting non-3GPP access and the non-3GPP gateway. Therefore, when the UE moves from the 3GPP network to the non-3GPP network for access, the target UP functional entity is still suitable to continue serving the UE, thereby ensuring service continuity.

Actions of the CP functional entity in operations S402, S405, S407, S408, S411, and S412 may be performed by the processor 201 in the computer device 200 shown in FIG. 2, by invoking the application program code stored in the memory 203. This is not limited in this embodiment of the present application.

Optionally, after operation S412, the UE may further initiate a non-3GPP access and PDU session establishment process in the 5G network architecture shown in FIG. 1. The process relates to interaction between the UE, an N3G access point, the N3G-GW, the UP functional entity, and the CP functional entity. The UP functional entity in the process is the target UP functional entity selected in the foregoing case of 3GPP access. Operations S413 to S423 in the process are the same as operations S311 to S321 in the embodiment shown in FIG. 3. Details are not described herein in this embodiment of the present application again.

Actions of the CP functional entity in operations S415, S418, and S421 may be performed by the processor 201 in the computer device 200 shown in FIG. 2, by invoking the application program code stored in the memory 203. This is not limited in this embodiment of the present application.

In this embodiment of the present application, the CP functional entity completes, in a PDU connection establishment procedure in the case of 3GPP access, selection of the target UP functional entity supporting non-3GPP access. In contrast, in the embodiment shown in FIG. 3, the CP functional entity completes, in an attach procedure in the case of 3GPP access, selection of the target UP functional entity supporting non-3GPP access. In addition, in this embodiment of the present application, at least one of the non-3GPP access capability of the UE or the connection type indication may not only be carried in the attach message but also be carried when the UE initiates the PDU connection establishment procedure.

Figure 5A:
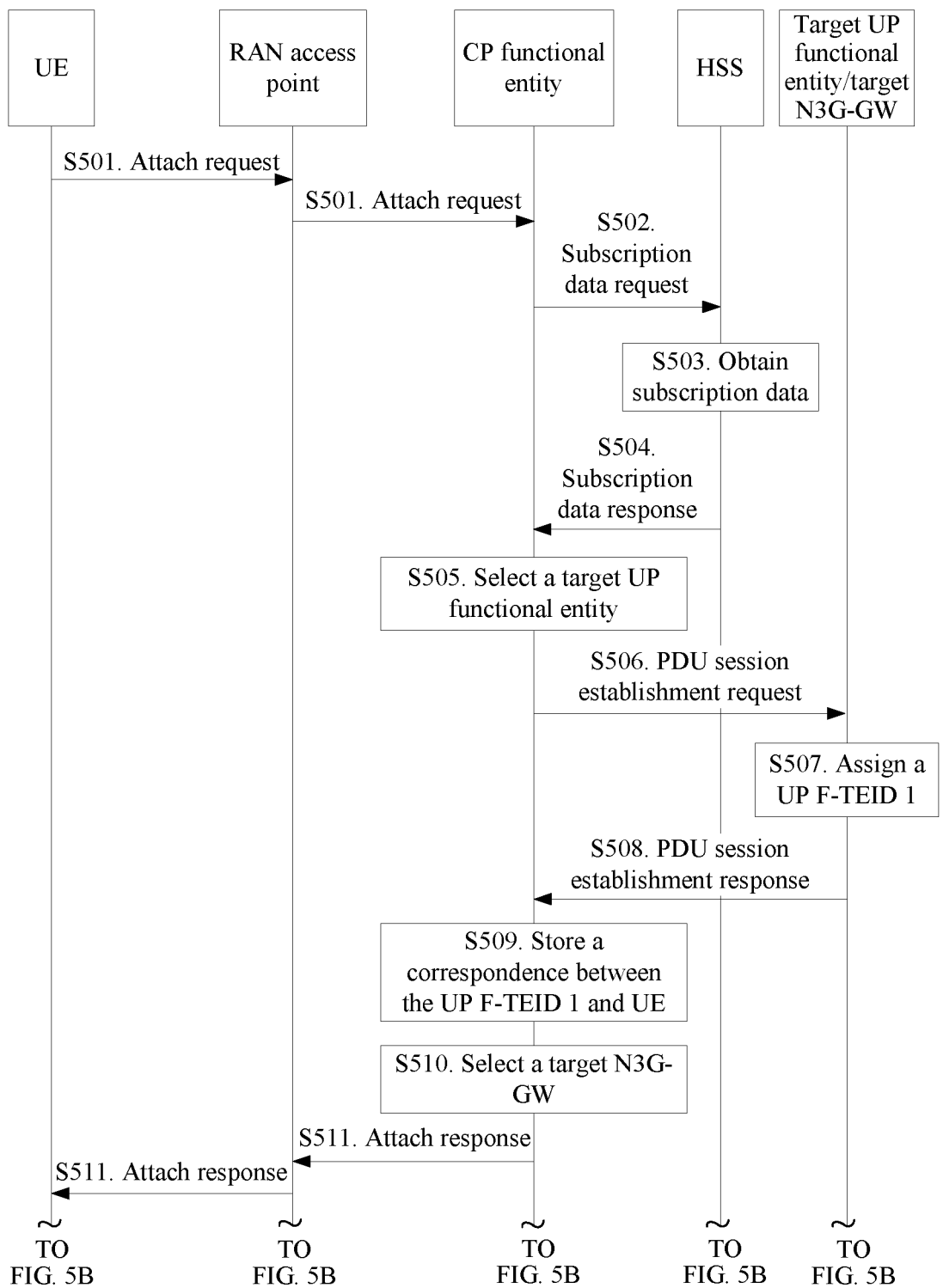
FIG. 5A and FIG. 5B show a schematic flowchart of still another method for selecting a UP functional entity supporting non-3GPP access according to an embodiment of the present application.
Figure 5B:
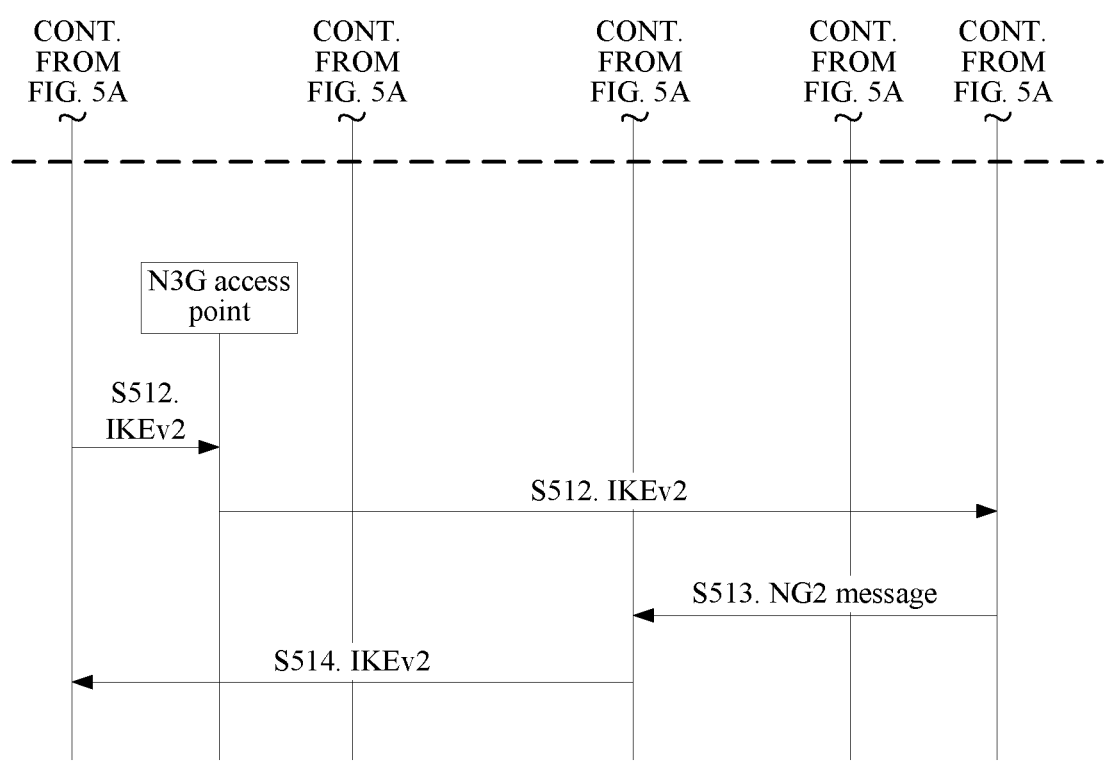

In still another possible implementation, FIG. 5A and FIG. 5B are a schematic flowchart of still another method for selecting a UP functional entity supporting non-3GPP access according to an embodiment of the present application. The method is described by using an example in which UE performs access via the 3GPP network in the 5G network architecture shown in FIG. 1, and relates to interaction between the UE, the RAN access point, the UP functional entity, the CP functional entity, and the HSS. The method includes the following operations S501 to S511.

Operations S501 to S509 are the same as operations S301 to S309.

S510. The CP functional entity selects a target N3G-GW for the UE based on at least one condition such as a location of the UE, whether the N3G-GW is integrated with the target UP functional entity, or a load status of the N3G-GW.

S511. The CP functional entity sends an attach response (message to the UE by using the RAN access point, where the attach response message carries an identifier of the target N3G-GW, so that the UE receives the attach response message.

The identifier of the target N3G-GW may be, for example, a fully qualified domain name (FQDN) of the target N3G-GW or an IP address of the target N3G-GW. This is not specifically limited in this embodiment of the present application.

This is the end of a process in which the UE performs access via the 3GPP network in the 5G network architecture shown in FIG. 1 and establishes a PDU session.

In the foregoing process, when selecting the target UP functional entity supporting non-3GPP access, the CP functional entity considers whether the UE is allowed to connect to the non-3GPP network, and when the UE is allowed to connect to the non-3GPP network, the CP functional entity selects the target UP functional entity supporting non-3GPP access. The interface NG3 shown in FIG. 1 exists between the target UP functional entity supporting non-3GPP access and the non-3GPP gateway. Therefore, when the UE moves from the 3GPP network to the non-3GPP network for access, the target UP functional entity is still suitable to continue serving the UE, thereby ensuring service continuity. In addition, when the UE performs access via the 3GPP network, the target N3G-GW is further selected for the UE based on the at least one condition such as the location of the UE, whether the N3G-GW is integrated with the target UP functional entity, or the load status of the N3G-GW, so that an N3G-GW that has relatively low load and that is relatively close to the UE can be obtained.

Actions of the CP functional entity in operations S502, S505, S506, S509, S510, and S511 may be performed by the processor 201 in the computer device 200 shown in FIG. 2, by invoking the application program code stored in the memory 203. This is not limited in this embodiment of the present application.

Optionally, after operation S511, the UE may further initiate a non-3GPP access and PDU session establishment process in the 5G network architecture shown in FIG. 1. The process relates to interaction between the UE, an N3G access point, the target N3G-GW, the UP functional entity, and the CP functional entity. The UP functional entity in the process is the target UP functional entity selected in the foregoing case of 3GPP access. The N3G-GW in the process is the target N3G-GW selected in the foregoing case of 3GPP access. The process includes the following operations.

S512. The UE establishes a connection to the N3G access point and initiates an IPsec connection to the target N3G-GW.

If the attach response message in operation S511 carries the identifier of the target N3G-GW rather than the IP address of the target N3G-GW, the UE may obtain, through DNS query, the IP address of the target N3G-GW based on the received identifier of the target N3G-GW, and further initiate the IPsec connection to the target N3G-GW based on the IP address of the target N3G-GW.

If the identifier of the target N3G-GW carried in the attach response message in operation S511 is the IP address of the target N3G-GW, the UE may directly initiate the IPsec connection to the target N3G-GW based on the IP address of the target N3G-GW.

That the UE establishes an IPsec connection to the N3G-GW may be, for example, that the UE sends an IKEv2 message to the N3G-GW by using the N3G access point. The IKEv2 message may be an IKE_AUTH message. The IKE_AUTH message may carry NAS signaling or EAP signaling. This is not specifically limited in this embodiment of the present application. The following operations in this embodiment of the present application are described by using an example in which the IKE_AUTH message may carry the NAS signaling.

If the target N3G-GW selected in operation S510 cannot be integrated with the target UP functional entity, for subsequent operations in this embodiment of the present application, reference may be made to operations S312 to S321 in FIG. 3, and an only difference lies in that the N3G-GW in FIG. 3A and FIG. 3B are a substituted with the target N3G-GW in this embodiment of the present application. Details are not described herein in this embodiment of the present application again.

If the target N3G-GW selected in operation S510 can be integrated with the target UP functional entity, as shown in FIG. 5A and FIG. 5B, after operation S512, the following operations S513 and S514 may be further included.

S513. The target N3G-GW obtains the NAS signaling in operation S512 and sends the NAS signaling to the CP functional entity by using a message of the interface NG2 between the N3G-GW and the CP functional entity shown in FIG. 1, so that the CP functional entity receives the NAS signaling.

The NAS signaling may include, for example, a PDU session establishment response message.

S514. The CP functional entity sends the NAS signaling to the UE by using the IKEv2 message, so that the UE receives the IKEv2 message.

To be specific, the CP functional entity encapsulates the NAS signaling into the IKEv2 message and sends the IKEv2 message to the UE.

This is the end of a process in which the UE performs access via the non-3GPP network in the 5G network architecture shown in FIG. 1 and establishes a PDU session.

The UP functional entity in the foregoing process is the target UP functional entity selected in the foregoing case of 3GPP access. In the foregoing case of 3GPP access, when selecting the target UP functional entity supporting non-3GPP access, the CP functional entity considers whether the UE is allowed to connect to the non-3GPP network. When the UE is allowed to connect to the non-3GPP network, the CP functional entity selects the target UP functional entity supporting non-3GPP access. The interface NG3 shown in FIG. 1 exists between the target UP functional entity supporting non-3GPP access and the non-3GPP gateway. Therefore, when the UE moves from the 3GPP network to the non-3GPP network for access, the target UP functional entity is still suitable to continue serving the UE, thereby ensuring service continuity. In addition, when the UE performs access via the non-3GPP network, the UE establishes the IPsec connection to the target N3G-GW selected in the foregoing case of 3GPP access, and the target N3G-GW is selected based on the at least one condition such as the location of the UE, whether the N3G-GW is integrated with the target UP functional entity, or the load status of the N3G-GW, and is an N3G-GW that has relatively low load and that is relatively close to the UE. Therefore, the UE can establish the IPsec connection to the N3G-GW that has relatively low load and that is relatively close to the UE.

Actions of the CP functional entity in operation S514 may be performed by the processor 201 in the computer device 200 shown in FIG. 2, by invoking the application program code stored in the memory 203. This is not limited in this embodiment of the present application.

Figure 6A:
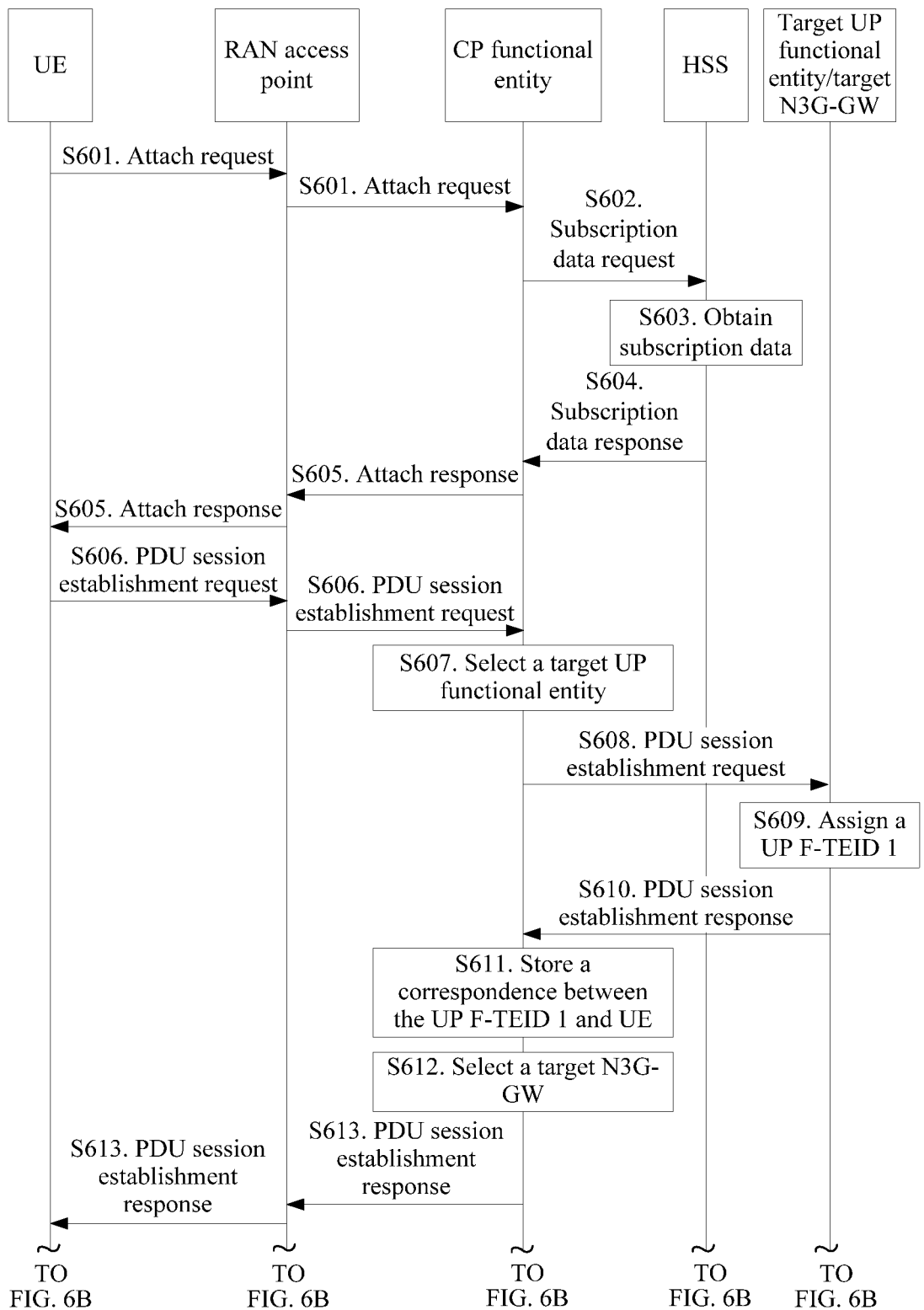
FIG. 6A and FIG. 6B show a schematic flowchart of still another method for selecting a UP functional entity supporting non-3GPP access according to an embodiment of the present application.
Figure 6B:
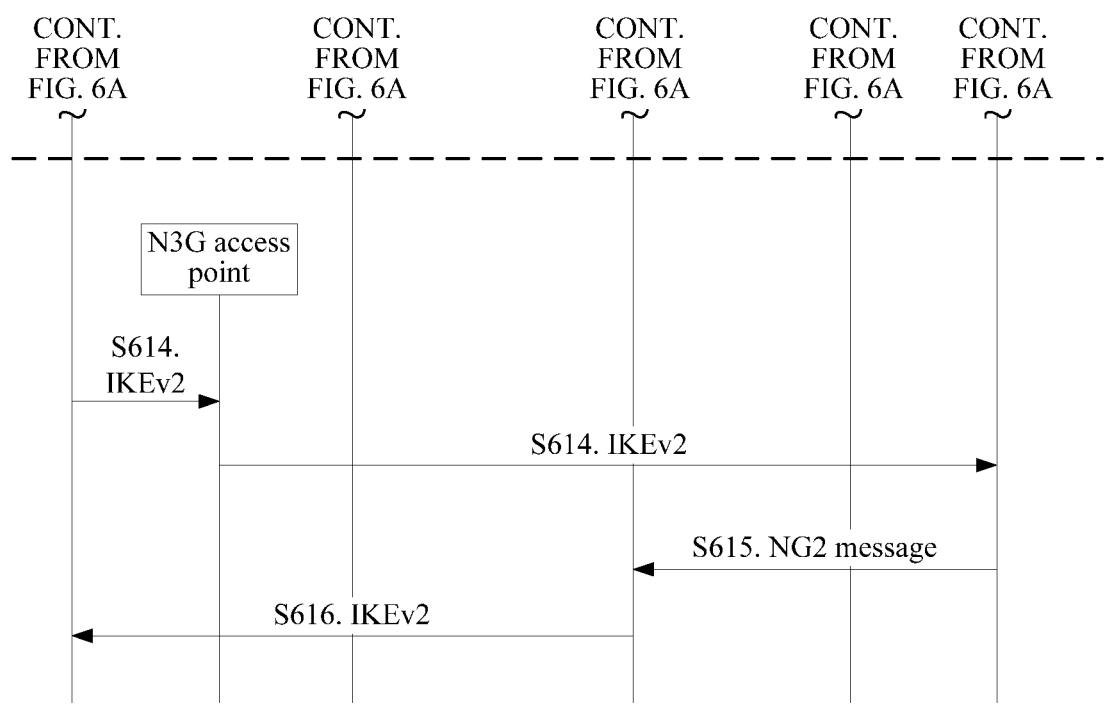

In still another possible implementation, FIG. 6A and FIG. 6B are a schematic flowchart of still another method for selecting a UP functional entity supporting non-3GPP access according to an embodiment of the present application. The method is described by using an example in which UE performs access via the 3GPP network in the 5G network architecture shown in FIG. 1, and relates to interaction between the UE, the RAN access point, the UP functional entity, the CP functional entity, and the HSS. The method includes the following operations S601 to S613.

Operations S601 to S611 are the same as operations S401 to S411.

S612. The CP functional entity selects a target N3G-GW for the UE based on at least one condition such as a location of the UE, whether the N3G-GW is integrated with the target UP functional entity, or a load status of the N3G-GW.

S613. The CP functional entity sends a PDU session establishment response message to the UE by using the RAN access point, where the PDU session establishment response message carries an identifier of the target N3G-GW, so that the CP functional entity receives the PDU session establishment response message.

The identifier of the target N3G-GW may be, for example, an FQDN of the target N3G-GW or an IP address of the target N3G-GW. This is not specifically limited in this embodiment of the present application.

This is the end of a process in which the UE performs access via the 3GPP network in the 5G network architecture shown in FIG. 1 and establishes a PDU session.

In the foregoing process, when selecting the target UP functional entity supporting non-3GPP access, the CP functional entity considers whether the UE is allowed to connect to the non-3GPP network, and when the UE is allowed to connect to the non-3GPP network, the CP functional entity selects the target UP functional entity supporting non-3GPP access. The interface NG3 shown in FIG. 1 exists between the target UP functional entity supporting non-3GPP access and the non-3GPP gateway. Therefore, when the UE moves from the 3GPP network to the non-3GPP network for access, the target UP functional entity is still suitable to continue serving the UE, thereby ensuring service continuity. In addition, when the UE performs access via the 3GPP network, the target N3G-GW is further selected for the UE based on the at least one condition such as the location of the UE, whether the N3G-GW is integrated with the target UP functional entity, or the load status of the N3G-GW, so that an N3G-GW that has relatively low load and that is relatively close to the UE can be obtained.

Actions of the CP functional entity in operations S602, S605, S607, S608, S611, S612, and S613 may be performed by the processor 201 in the computer device 200 shown in FIG. 2, by invoking the application program code stored in the memory 203. This is not limited in this embodiment of the present application.

Optionally, after operation S613, the UE may further initiate a non-3GPP access and PDU session establishment process in the 5G network architecture shown in FIG. 1. The process relates to interaction between the UE, an N3G access point, the target N3G-GW, the UP functional entity, and the CP functional entity. The UP functional entity in the process is the target UP functional entity selected in the foregoing case of 3GPP access. The N3G-GW in the process is the target N3G-GW selected in the foregoing case of 3GPP access. When the target N3G-GW selected in operation S612 cannot be integrated with the target UP functional entity, for subsequent operations in this embodiment of the present application, reference may be made to operations S312 to S321 in FIG. 3, and an only difference lies in that the N3G-GW in FIG. 3A and FIG. 3B are a substituted with the target N3G-GW in this embodiment of the present application. Details are not described herein in this embodiment of the present application again. When the target N3G-GW selected in operation S612 can be integrated with the target UP functional entity, operations S614 to S616 in the process are the same as operations S512 to S514 in the embodiment shown in FIG. 5A and FIG. 5B. Details are not described herein in this embodiment of the present application again.

Actions of the CP functional entity in operation S616 may be performed by the processor 201 in the computer device 200 shown in FIG. 2, by invoking the application program code stored in the memory 203. This is not limited in this embodiment of the present application.

In this embodiment of the present application, the CP functional entity completes, in a PDU connection establishment procedure in the case of 3GPP access, selection of the target UP functional entity supporting non-3GPP access and selection of the target N3G-GW. In contrast, in the embodiment shown in FIG. 5A and FIG. 5B, the CP functional entity completes, in an attach procedure in the case of 3GPP access, selection of the target UP functional entity supporting non-3GPP access and selection of the target N3G-GW. In addition, in this embodiment of the present application, at least one of the non-3GPP access capability of the UE or the connection type indication may not only be carried in the attach message but also be carried when the UE initiates the PDU connection establishment procedure.

Optionally, during specific implementation, in the embodiment shown in FIG. 5A and FIG. 5B or FIG. 6A and FIG. 6B, the CP functional entity may alternatively not select the target N3G-GW for the UE based on the at least one condition such as the location of the UE, whether the N3G-GW is integrated with the target UP functional entity, or the load status of the N3G-GW. Instead, the attach response message or the PDU session establishment response message sent by the CP functional entity to the UE by using the RAN access point carries an identifier of the target UP functional entity, and the UE determines the target N3G-GW based on the identifier of the target UP functional entity. The following may be included: After obtaining the identifier of the target UP functional entity, the UE queries for an N3G-GW identifier based on a DNS to obtain an N3G-GW identifier list. For each N3G-GW identifier in the N3G-GW identifier list, the UE compares a character string of an FQDN of an N3G-GW corresponding to the N3G-GW identifier and a character string of an FQDN of the target UP corresponding to the identifier of the target UP functional entity, to determine whether they match, and preferentially selects an N3G-GW that is integrated with the UP functional entity, as the target N3G-GW. If it is found through comparison that the character strings of the FQDNs of the N3G-GW and the target UP functional entity are exactly the same, the N3G-GW and the target UP functional entity are an integrated node. If the character strings are not the same, the UE selects an N3G-GW best matching the UP functional entity, as the target N3G-GW, where a physical location of the N3G-GW is closest to that of the target UP functional entity. After the target N3G-GW is selected in the foregoing manner, for operations in which the UE subsequently initiates the non-3GPP access and PDU session establishment process in the 5G network architecture shown in FIG. 1, reference may be made to the embodiment shown in FIG. 5A and FIG. 5B or FIG. 6A and FIG. 6B, and details are not described herein again.

Optionally, during specific implementation, the target N3G-GW may alternatively not be selected when the UE is connected to the 3GPP network; instead, the target N3G-

Figure 7A:
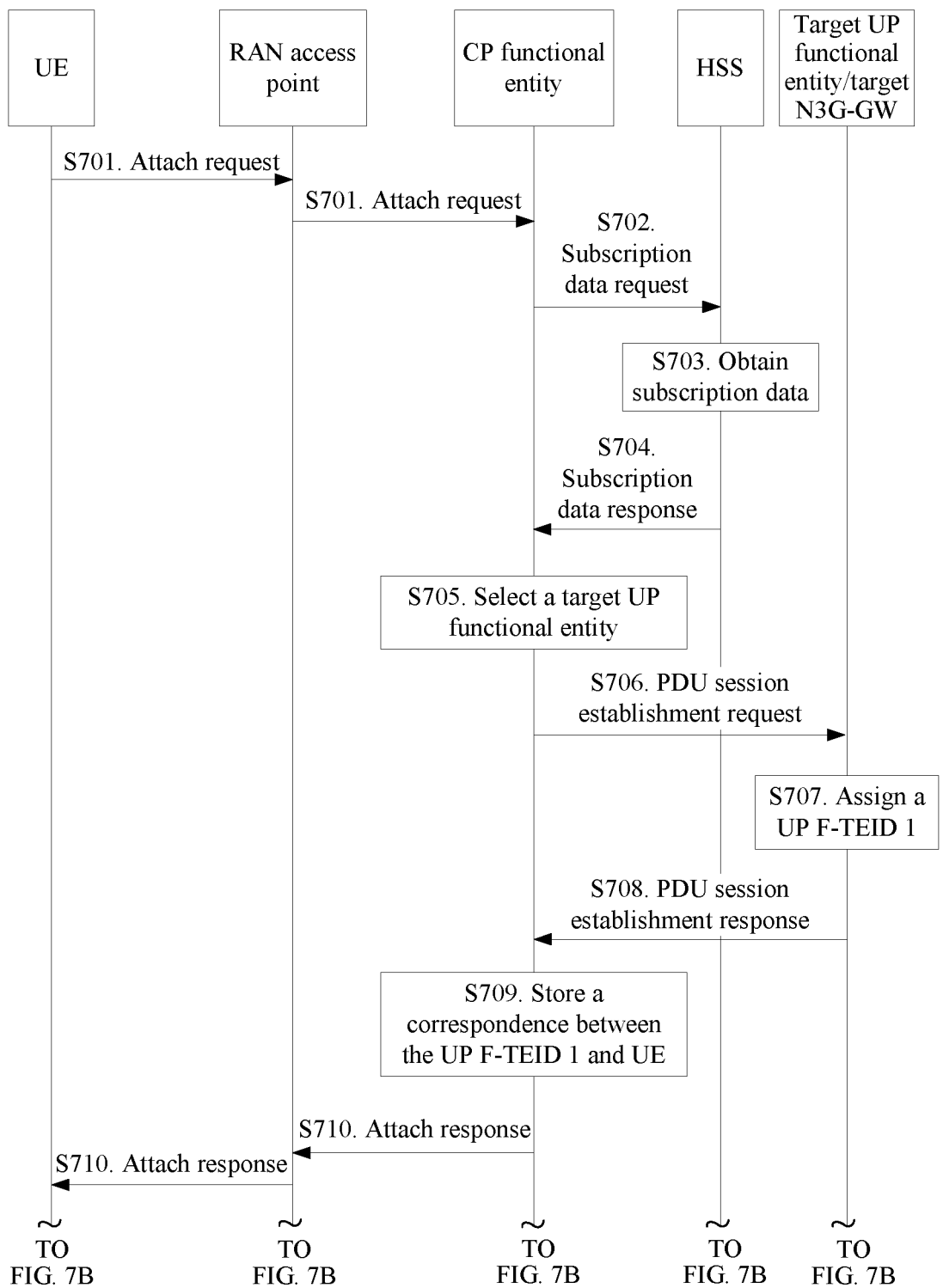
FIG. 7A and FIG. 7B show a schematic flowchart of still another method for selecting a UP functional entity supporting non-3GPP access according to an embodiment of the present application.
Figure 7B:
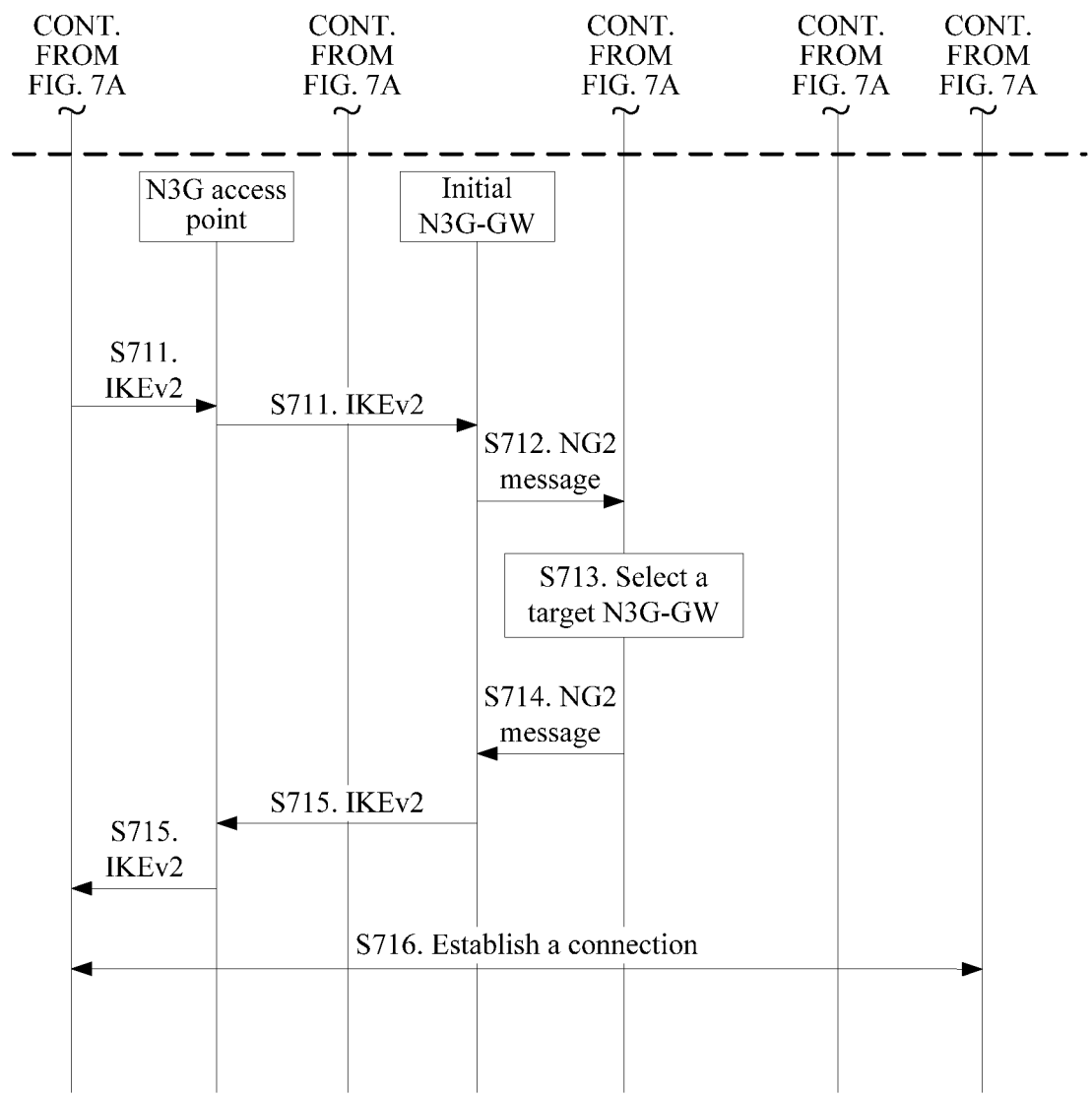

GW is selected when the UE is connected to the non-3GPP network. For example, as shown in FIG. 7A and FIG. 7B, assuming that operations S701 to S710 of a process in which the UE performs access via the 3GPP network in the 5G network architecture shown in FIG. 1 and establishes a PDU session are the same as operations S301 to S310 in the embodiment shown in FIG. 3, the following operations may be further included after operation S710.

Operation S711 is the same as operation S311.

Operation S712 is the same as operation S312.

S713. The CP functional entity selects a target N3G-GW for the UE based on at least one condition such as a location of the UE, whether the N3G-GW is integrated with the target UP functional entity, or a load status of the N3G-GW.

S714. The CP functional entity sends the identifier of the target N3G-GW to an initial N3G-GW by using a message of the interface NG2 shown in FIG. 1, so that the initial N3G-GW receives the identifier of the target N3G-GW.

For related descriptions of the identifier of the target N3G-GW, refer to the foregoing embodiment. Details are not described herein in this embodiment of the present application again.

The message of the interface NG2 is, for example, a connection establishment request message or an NG2 message. In addition, the CP functional entity may further send, to the N3G-GW by using the message of the interface NG2 between the CP functional entity and the N3G-GW shown in FIG. 1, the NAS signaling sent to the UE. The NAS signaling may include, for example, a PDU session establishment response message.

S715. The initial N3G-GW sends, to the UE by using an IKEv2 message, the NAS signaling and the identifier of the target N3G-GW that are sent by the CP functional entity and that are received in operation S714, so that the UE receives the NAS signaling and the identifier of the target N3G-GW. In addition, the initial N3G-GW disconnects from the UE.

Optionally, the IKEv2 message may further carry a redirection indication.

S716. The UE initiates a connection to the target N3G-GW based on the received identifier of the target N3G-GW.

Optionally, the UE may alternatively initiate the connection to the target N3G-GW based on the redirection indication. This is not specifically limited in this embodiment of the present application.

For a process of initiating, by the UE, the connection to the target N3G-GW, refer to the embodiment shown in FIG. 5A and FIG. 5B or FIG. 6A and FIG. 6B. Details are not described herein in this embodiment of the present application again.

Actions of the CP functional entity in operations S702, S705, S706, S709, S710, S713, and S714 may be performed by the processor 201 in the computer device 200 shown in FIG. 2, by invoking the application program code stored in the memory 203. This is not limited in this embodiment of the present application.

In contrast to the embodiment shown in FIG. 5A and FIG. 5B or FIG. 6A and FIG. 6B, in this embodiment of the present application, after the UE is connected to the non-3GPP network, the CP functional entity performs N3G-GW reselection and notifies the UE of the identifier of the reselected target N3G-GW. The UE disconnects from the initial N3G-GW and initiates a procedure of establishing an IPsec connection to the target N3G-GW. The reselected target N3G-GW is selected based on the at least one condition such as the location of the UE, whether the N3G-GW is integrated with the target UP functional entity, or the load status of the N3G-GW, so that an N3G-GW that has relatively low load and that is relatively close to the UE can be obtained. The procedure of establishing the IPsec connection is initiated based on the N3G-GW that has relatively low load and that is relatively close to the UE.

Optionally, during specific implementation, in the embodiment shown in FIG. 7A and FIG. 7B, the CP functional entity may alternatively not select the target N3G-GW for the UE based on the at least one condition such as the location of the UE, whether the N3G-GW is integrated with the target UP functional entity, or the load status of the N3G-GW. Instead, the NG2 message sent by the CP functional entity to the initial N3G-GW carries the identifier of the target UP functional entity, and further, the IKEv2 message sent by the initial N3G-GW to the UE by using the N3G access point carries the identifier of the target UP functional entity, so that the UE determines the target N3G-GW based on the identifier of the target UP functional entity. For a manner of determining, by the UE, the target N3G-GW based on the identifier of the target UP functional entity, refer to the foregoing embodiment. Details are not described herein in this embodiment of the present application again. After selecting the target N3G-GW in the foregoing manner, the UE may initiate the connection to the target N3G-GW based on the identifier of the target N3G-GW. For details, refer to the embodiment shown in FIG. 5A and FIG. 5B or FIG. 6A and FIG. 6B. Details are not described herein in this embodiment of the present application again.

It should be noted that in the foregoing N3G-GW reselection process, for the process in which the UE performs access via the 3GPP network in the 5G network architecture shown in FIG. 1 and establishes the PDU session, reference may also be made to operations S401 to S412 in the embodiment shown in FIG. 4A and FIG. 4B. This is not specifically limited in this embodiment of the present application.

The foregoing describes the solutions provided in the embodiments of the present application, mainly from a perspective of interaction between network elements. It can be understood that, to implement the foregoing functions, the foregoing device implementing the CP functional entity includes corresponding hardware structures and/or software modules for performing the functions. A person skilled in the art should be easily aware that, units and algorithm operations of the examples described with reference to the embodiments disclosed in this specification may be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of the present application.

In the embodiments of the present application, the CP functional entity may be divided into functional modules according to the foregoing method examples. For example, each functional module may be corresponding to one function, or two or more functions may be integrated into one processing module. The integrated module may be implemented in a form of hardware, or may be implemented in a form of a software functional module. It should be noted that the module division in the embodiments of the present application is an example, is merely logical function division, and may be other division during actual implementation.

Figure 8:
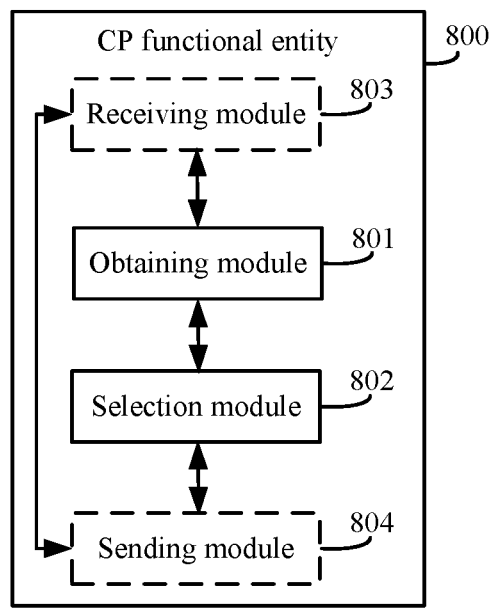
FIG. 8 is a schematic structural diagram of a CP functional entity according to an embodiment of the present application.

For example, a division manner in which each functional module is corresponding to one function is used. FIG. 8 is a possible schematic structural diagram of the CP functional entity in the foregoing embodiments. The CP functional entity 800 includes an obtaining module 801 and a selection module 802.

The obtaining module 801 is configured to: when UE performs access via a 3GPP network, obtain subscription data of the UE, where the subscription data includes indication information that indicates whether the UE is allowed to connect to a non-3GPP network.

The selection module 802 is configured to: if the indication information indicates that the UE is allowed to connect to the non-3GPP network, select a target UP functional entity supporting non-3GPP access.

Further, that the selection module 802 selects a target UP functional entity supporting non-3GPP access includes: The selection module 802 obtains a non-3GPP access capability of at least one UP functional entity, and selects, from the at least one UP functional entity based on the non-3GPP access capability of the at least one UP functional entity, the target UP functional entity supporting non-3GPP access.

Specifically, the non-3GPP access capability of the at least one UP functional entity includes:

at least one of the following: that the UP functional entity supports an IPsec connection, that the UP functional entity supports an interface between the UP functional entity and a non-3GPP gateway, that the UP functional entity is integrated with a non-3GPP gateway, or that the UP functional entity supports a PPPOE.

Further, in a possible implementation, that the subscription data includes indication information that indicates whether the UE is allowed to connect to a non-3GPP network includes:

the subscription data includes a network access mode parameter; and if the network access mode parameter is set to a packet switched domain or if the network access mode parameter is set to a packet switched domain or a circuit switched domain, it indicates that the UE is allowed to connect to the non-3GPP network, or if the network access mode parameter is set to a circuit switched domain, it indicates that the UE is not allowed to connect to the non-3GPP network.

In another possible implementation, that the subscription data includes indication information that indicates whether the UE is allowed to connect to a non-3GPP network includes:

if the subscription data includes a non-3GPP allowed indication, it indicates that the UE is allowed to connect to the non-3GPP network, or if the subscription data excludes a non-3GPP allowed indication, it indicates that the UE is not allowed to connect to the non-3GPP network.

In still another possible implementation, that the subscription data includes indication information that indicates whether the UE is allowed to connect to a non-3GPP network includes:

if the subscription data includes a non-3GPP not allowed indication, it indicates that the UE is not allowed to connect to the non-3GPP network, or if the subscription data excludes a non-3GPP not allowed indication, it indicates that the UE is allowed to connect to the non-3GPP network.

Further, as shown in FIG. 8, the CP functional entity 800 further includes a receiving module 803.

That the receiving module 801 obtains subscription data of the UE includes:

the obtaining module 801 obtains, through DNS query, the non-3GPP access capability of the at least one UP functional entity; or the obtaining module 801 obtains the configured non-3GPP access capability of the at least one UP functional entity, where the receiving module 803 is configured to: when each of the at least one UP functional entity establishes a connection to the CP functional entity, receive a connection establishment request message sent by the UP functional entity, where the connection establishment request message carries a non-3GPP access capability of the UP functional entity.

Further, before the selection module 802 selects, from the at least one UP functional entity based on the non-3GPP access capability of the at least one UP functional entity, the target UP functional entity supporting non-3GPP access, the obtaining module 801 is further configured to obtain a non-3GPP access capability of the UE.

That the selection module 802 selects, from the at least one UP functional entity based on the non-3GPP access capability of the at least one UP functional entity, the target UP functional entity supporting non-3GPP access includes:

the selection module 802 is configured to: if the non-3GPP access capability of the UE represents that the UE is UE supporting non-3GPP access, select, from the at least one UP functional entity based on the non-3GPP access capability of the at least one UP functional entity, the target UP functional entity supporting non-3GPP access.

Specifically, the non-3GPP access capability of the UE includes:

at least one of the following: that the UE supports multiple access, that the UE supports Wi-Fi access, that the UE supports an IPsec connection, that the UE supports fixed network access, that the UE supports unlicensed spectrum access, or that the UE supports a PPPOE.

Further, as shown in FIG. 8, the CP functional entity 800 further includes a receiving module 803 and a sending module 804.

After the selection module 802 selects the target UP functional entity supporting non-3GPP access, the receiving module 803 is configured to: when the UE performs access via the non-3GPP network, receive non-access stratum NAS signaling sent by the UE, where the NAS signaling carries a PDU session establishment request message.

The sending module 804 is configured to send the PDU session establishment request message to the target UP functional entity.

The receiving module 803 is further configured to receive a PDU session establishment response message sent by the target UP functional entity, where the PDU session establishment response message carries an F-TEID of the target UP functional entity that is assigned by the target UP functional entity, and the F-TEID of the target UP functional entity includes an Internet Protocol IP address of the target UP functional entity and a TEID of the target UP functional entity.

The sending module 804 is further configured to send the F-TEID of the target UP functional entity to the non-3GPP gateway N3G-GW.

The receiving module 803 is further configured to receive an F-TEID of the N3G-GW that is assigned by the N3G-GW, where the F-TEID of the N3G-GW includes an IP address of the N3G-GW and a TEID of the N3G-GW.

The sending module 804 is further configured to send the F-TEID of the N3G-GW to the target UP functional entity.

Specifically, the IP address of the target UP functional entity and the IP address of the N3G-GW are device-granularity IP addresses, and the TEID of the target UP functional entity and the TEID of the N3G-GW are device-granularity TEIDs; or the IP address of the target UP functional entity and the IP address of the N3G-GW are session-granularity IP addresses, and the TEID of the target UP functional entity and the TEID of the N3G-GW are session-granularity TEIDs.

Further, in a possible implementation, as shown in FIG. 8, the CP functional entity 800 further includes a sending module 804.

After the selection module 802 selects the target UP functional entity supporting non-3GPP access, the selection module 802 is further configured to: before the UE performs access via the non-3GPP network, select a target N3G-GW for the UE based on at least one condition such as a location of the UE, whether the N3G-GW is integrated with the target UP functional entity, or a load status of the N3G-GW.

The sending module 804 is configured to send an identifier of the target N3G-GW to the UE.

In another possible implementation, as shown in FIG. 8, the CP functional entity 800 further includes a sending module 804.

After the selection module 802 selects the target UP functional entity supporting non-3GPP access, the sending module 804 is configured to: before the UE performs access via the non-3GPP network, send an identifier of the target UP functional entity to the UE, where the identifier of the target UP functional entity is used by the UE to choose to integrate with the target UP functional entity or select a target N3G-GW whose physical location is closest to that of the target UP functional entity.

In still another possible implementation, as shown in FIG. 8, the CP functional entity 800 further includes a sending module 804.

After the selection module 802 selects the target UP functional entity supporting non-3GPP access, the selection module 802 is further configured to: when the UE performs access via the non-3GPP network, select a target N3G-GW for the UE based on at least one condition such as a location of the UE, whether the N3G-GW is integrated with the target UP functional entity, or a load status of the N3G-GW.

The sending module 804 is configured to send an identifier of the target N3G-GW to the UE by using an initial N3G-GW connected to the UE.

All related content of the operations in the foregoing method embodiments may be cited in function descriptions of corresponding functional modules. Details are not described herein again.

Figure 9:
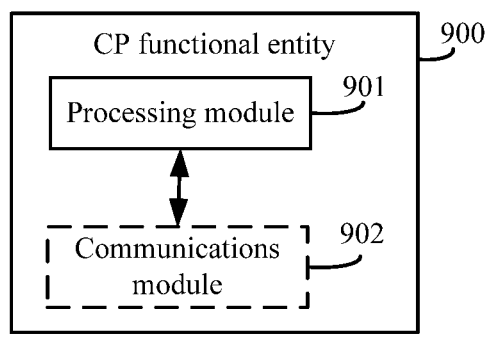
FIG. 9 is a schematic structural diagram of another CP functional entity according to an embodiment of the present application.

For a case in which functional modules are integrated, FIG. 9 is a possible schematic structural diagram of the CP functional entity in the foregoing embodiments. The CP functional entity 900 includes a processing module 901 and a communications module 902. The processing module 901 may be configured to perform operations performed by the obtaining module 801 and the selection module 802 in FIG. 8. The communications module 902 may be configured to perform operations performed by the receiving module 803 and the sending module 804 in FIG. 8. For details, refer to the embodiment shown in FIG. 8. Details are not described herein in this embodiment of the present application again.

All related content of the operations in the foregoing method embodiments may be cited in function descriptions of corresponding functional modules. Details are not described herein again.

In the embodiments, the CP functional entity is presented in a form in which each functional module is corresponding to one function, or the CP functional entity is presented in a form in which functional modules are integrated. The "module" herein may be an application-specific integrated circuit (ASIC), a circuit, a processor and a memory that execute one or more software or firmware programs, an integrated logic circuit, and/or another component that can provide the foregoing functions. In a simple embodiment, a person skilled in the art may figure out that a form shown in FIG. 2 may be used for the CP functional entity 800 or the CP functional entity 900. For example, the obtaining module 801, the selection module 802, the receiving module 803, and the sending module 804 in FIG. 8 may be implemented by the processor 201 and the memory 203 in FIG. 2. Specifically, the obtaining module 801, the selection module 802, the receiving module 803, and the sending module 804 may be implemented by invoking, by the processor 201, the application program code stored in the memory 203. This is not limited in this embodiment of the present application. Alternatively, for example, the processing module 901 and the communications module 902 in FIG. 9 may be implemented by the processor 201 and the memory 203 in FIG. 2. Specifically, the processing module 901 and the communications module 902 may be implemented by invoking, by the processor 201, the application program code stored in the memory 203. This is not limited in this embodiment of the present application.

An embodiment of the present application further provides a computer storage medium, configured to store a computer software instruction for use by the foregoing CP functional entity. The computer software instruction includes a program designed for executing the foregoing method embodiments. Executing the stored program can implement selection of a UP functional entity supporting non-3GPP access.

Although the present application is described with reference to the embodiments, in a process of implementing the present application that claims protection, a person skilled in the art may understand and implement another variation of the disclosed embodiments by viewing the accompanying drawings, disclosed content, and the appended claims. In the claims, "comprising" does not exclude another component or another operation, and "a" or "an" does not exclude a case of plurality. A single processor or another unit may implement several functions enumerated in the claims. Some measures are described in dependent claims that are different from each other, but this does not mean that these measures cannot be combined to produce a better effect.

A person skilled in the art should understand that the embodiments of the present application may be provided as a method, an apparatus (device), or a computer program product. Therefore, the present application may use a form of hardware only embodiments, software only embodiments, or embodiments with a combination of software and hardware. Moreover, the present application may use a form of a computer program product that is implemented on one or more computer-usable storage media (including but not limited to a magnetic disk memory, a CD-ROM, an optical memory, and the like) that include computer-usable program code. The computer program is stored/distributed in a proper medium, and is provided together with another hardware or used as a part of hardware, or may be distributed in another form, such as by using the Internet or another wired or wireless telecommunications system.

The present application is described with reference to the flowcharts and/or the block diagrams of the method, the apparatus (device), and the computer program product according to the embodiments of the present application. It should be understood that computer program instructions may be used to implement each process and/or each block in the flowcharts and/or the block diagrams and a combination of a process and/or a block in the flowcharts and/or the block diagrams. These computer program instructions may be provided for a general-purpose computer, a special-purpose computer, an embedded processor, or a processor of another programmable data processing device to generate a machine, so that the instructions executed by the computer or the processor of the another programmable data processing device generate an apparatus for implementing a specified function in one or more processes in the flowcharts and/or in one or more blocks in the block diagrams.

These computer program instructions may alternatively be stored in a computer readable memory that can instruct a computer or another programmable data processing device to work in a specific manner, so that the instructions stored in the computer readable memory generate an artifact that includes an instruction apparatus. The instruction apparatus implements a specified function in one or more processes in the flowcharts and/or in one or more blocks in the block diagrams.

These computer program instructions may alternatively be loaded onto a computer or another programmable data processing device, so that a series of operations are performed on the computer or the another programmable device, thereby generating computer-implemented processing. Therefore, the instructions executed on the computer or the another programmable device provide operations for implementing a specified function in one or more processes in the flowcharts and/or in one or more blocks in the block diagrams.

Although the present application is described with reference to specific features and the embodiments thereof, apparently, various modifications and combinations may be made to the embodiments without departing from the spirit and scope of the present application. Correspondingly, the specification and accompanying drawings are merely example descriptions of the present application defined by the appended claims, and are considered as covering any or all modifications, variations, combinations, or equivalents within the scope of the present application. Apparently, a person skilled in the art can make various modifications and variations to the present application without departing from the spirit and scope of the present application. The present application is intended to cover these modifications and variations of the present application provided that these modifications and variations fall within the scope of protection defined by the claims of the present application and equivalent technologies thereof.

What is claimed is:

1. A method for selecting a user plane (UP) functional entity supporting non-3rd Generation Partnership Project (non-3GPP) access, wherein the method comprises:
   when a user equipment (UE) performs access via a 3GPP network, obtaining, by a control plane (CP) functional entity, subscription data of the UE, wherein the subscription data comprises indication information that indicates whether the UE is allowed to connect to a non-3GPP network; and
   if the indication information indicates that the UE is allowed to connect to the non-3GPP network, selecting, by the CP functional entity, a target UP functional entity supporting the non-3GPP access, wherein the selecting the target UP functional entity supporting non-3GPP access comprises obtaining, by the CP functional entity, a non-3GPP access capability of at least one UP functional entity; and selecting, by the CP functional entity from the at least one UP functional entity based on the non-3GPP access capability of the at least one UP functional entity, the target UP functional entity supporting the non-3GPP access, wherein the obtaining the non-3GPP access capability of at least one UP functional entity comprises obtaining, by the CP functional entity through a domain name system DNS query, the non-3GPP access capability of the at least one UP functional entity; or obtaining, by the CP functional entity, a configured non-3GPP access capability of the at least one UP functional entity, wherein when each of the at least one UP functional entity establishes a connection to the CP functional entity, the CP functional entity receives a connection establishment request message sent by the UP functional entity, wherein the connection establishment request message carries the non-3GPP access capability of the UP functional entity.

2. The method according to claim 1, wherein
the subscription data comprises a network access mode parameter that is set to a packet switched domain or a circuit switched domain that indicates that the UE is allowed to connect to the non-3GPP network; or wherein the subscription data comprises a non-3GPP allowed indication that indicates that the UE is allowed to connect to the non-3GPP network; or wherein the subscription data comprises a non-3GPP not allowed indication that indicates that the UE is not allowed to connect to the non-3GPP network.

3. The method according to claim 1, wherein the non-3GPP access capability of the at least one UP functional entity comprises:
at least one of the following: an indication that the UP functional entity supports an Internet Protocol Security (IPsec) connection, an indication that the UP functional entity supports an interface between the UP functional entity and a non-3GPP gateway, an indication that the UP functional entity is integrated with a non-3GPP gateway, or an indication that the UP functional entity supports a Point-to-Point Protocol over Ethernet (PPPOE).

4. The method according to claim 1, wherein before the selecting, by the CP functional entity from the at least one UP functional entity based on the non-3GPP access capability of the at least one UP functional entity, the target UP functional entity supporting non-3GPP access, the method further comprises:
obtaining, by the CP functional entity, the non-3GPP access capability of the UE; and
the selecting, by the CP functional entity from the at least one UP functional entity based on the non-3GPP access capability of the at least one UP functional entity, the target UP functional entity supporting non-3GPP access comprises:
if the non-3GPP access capability of the UE represents that the UE is UE supporting non-3GPP access, selecting, by the CP functional entity from the at least one UP functional entity based on the non-3GPP access capability of the at least one UP functional entity, the target UP functional entity supporting non-3GPP access.

5. The method according to claim 4, wherein the non-3GPP access capability of the UE comprises:
at least one of the following: that the UE supports multiple access, that the UE supports a Wireless Fidelity Wi-Fi access, that the UE supports an IPsec connection, that the UE supports a fixed network access, that the UE supports an unlicensed spectrum access, or that the UE supports a Point-to-Point Protocol over Ethernet (PP-POE).

6. The method according to claim 1, wherein after the selecting, by the CP functional entity, the target UP functional entity supporting non-3GPP access, and before the UE performs access via the non-3GPP network, the method further comprises:
   selecting, by the CP functional entity, a target non-3GPP gateway (N3G-GW) for the UE based on at least one condition comprising a location of the UE, an indication of whether the N3G-GW is integrated with the target UP functional entity, or a load status of the N3G-GW; and
   sending, by the CP functional entity, an identifier of the target N3G-GW to the UE.

7. The method according to claim 1, wherein after the selecting, by the CP functional entity, the target UP functional entity supporting non-3GPP access, and before the UE performs access via the non-3GPP network, the method further comprises:
   sending, by the CP functional entity, an identifier of the target UP functional entity to the UE, wherein the identifier of the target UP functional entity is used by the UE to choose to integrate with the target UP functional entity or select a target N3G-GW whose physical location is closest to that of the target UP functional entity.

8. The method according to claim 1, wherein after the selecting, by the CP functional entity, the target UP functional entity supporting non-3GPP access, the method further comprises:
   when the UE performs access via the non-3GPP network, selecting, by the CP functional entity, a target N3G-GW for the UE based on at least one condition comprising a location of the UE, whether the N3G-GW is integrated with the target UP functional entity, or a load status of the N3G-GW; and
   sending, by the CP functional entity, an identifier of the target N3G-GW to the UE by using an initial N3G-GW connected to the UE.

9. A control plane CP functional entity, comprising:
   at least one processor; and a memory coupled to the at least one processor, wherein the at least one processor is configured to:
   obtain subscription data of a user equipment (UE) when the UE performs access via a 3rd Generation Partnership Project (3GPP) network, wherein the subscription data comprises indication information that indicates whether the UE is allowed to connect to a non-3GPP network; and
   if the indication information indicates that the UE is allowed to connect to the non-3GPP network, select a target user plane UP functional entity supporting the non-3GPP access, wherein the at least one processor is configured to obtain a non-3GPP access capability of at least one UP functional entity; and select from the at least one UP functional entity based on the non-3GPP access capability of the at least one UP functional entity, the target UP functional entity supporting the non-3GPP access, wherein the at least one processor is configured to obtain, through a domain name system DNS query, the non-3GPP access capability of the at least one UP functional entity, or obtain a configured non-3GPP access capability of the at least one UP functional entity, where the at least one processor is configured to when each of the at least one UP functional entity establishes a connection to the CP functional entity, receive a connection establishment request message sent by the UP functional entity, where in the connection, establishment request message carries the non-3GPP access capability of the UP functional entity.

10. The CP functional entity according to claim 9, wherein the subscription data comprises a network access mode parameter that is set to a packet switched domain or a circuit switched domain that indicates that the UE is allowed to connect to the non-3GPP network; or wherein the subscription data comprises a non-3GPP allowed indication that indicates that the UE is allowed to connect to the non-3GPP network; or wherein the subscription data comprises a non-3GPP not allowed indication that indicates that the UE is not allowed to connect to the non-3GPP network.

11. The CP functional entity according to claim 9, wherein the non-3GPP access capability of the at least one UP functional entity comprises:
   at least one of the following: an indication that the UP functional entity supports an Internet Protocol Security IPsec connection, an indication that the UP functional entity supports an interface between the UP functional entity and a non-3GPP gateway, an indication that the UP functional entity is integrated with a non-3GPP gateway, or an indication that the UP functional entity supports a Point-to-Point Protocol over Ethernet PPPOE.

12. The CP functional entity according to claim 9, wherein when executed by the at least one processor, further cause the at least one processor to perform operations comprising:
   obtaining the non-3GPP access capability of the UE before selecting, from the at least one UP functional entity based on the non-3GPP access capability of the at least one UP functional entity, the target UP functional entity supporting non-3GPP access; and
   if the non-3GPP access capability of the UE represents that the UE is UE supporting non-3GPP access, selecting, from the at least one UP functional entity based on the non-3GPP access capability of the at least one UP functional entity, the target UP functional entity supporting non-3GPP access.

13. The CP functional entity according to claim 9, wherein when executed by the at least one processor, further cause the at least one processor to perform operations comprising:
   selecting a target N3G-GW for the UE based on at least one condition comprising a location of the UE, an indication of whether the N3G-GW is integrated with the target UP functional entity, or a load status of the N3G-GW before the UE performs access via the non-3GPP network; and
   sending an identifier of the target N3G-GW to the UE.

14. The CP functional entity according to claim 9, wherein when executed by the at least one processor, further cause the at least one processor to perform operations comprising:
   sending an identifier of the target UP functional entity to the UE before the UE performs access via the non-3GPP network, wherein the identifier of the target UP functional entity is used by the UE to choose to integrate with the target UP functional entity or select a target N3G-GW whose physical location is closest to that of the target UP functional entity.

15. The CP functional entity according to claim 9, wherein when executed by the at least one processor, further cause the at least one processor to perform operations comprising:
- when the UE performs access via the non-3GPP network, selecting a target non-3GPP gateway (N3G-GW) for the UE based on at least one condition comprising a location of the UE, an indication of whether the N3G-GW is integrated with the target UP functional entity, or a load status of the N3G-GW; and
- sending an identifier of the target N3G-GW to the UE by using an initial N3G-GW connected to the UE.

16. A non-transitory computer readable storage medium storing computer instructions that when executed by one or more processors, cause the one or more processors to perform operations comprising:
- obtaining subscription data of a user equipment (UE) when the UE performs access via a 3rd Generation Partnership Project (3GPP) network, wherein the subscription data comprises indication information that indicates whether the UE is allowed to connect to a non-3GPP network; and
- if the indication information indicates that the UE is allowed to connect to the non-3GPP network, selecting a target user plane UP functional entity supporting the non-3GPP access, wherein the selecting the target UP functional entity supporting non-3GPP access comprises obtaining, by the CP functional entity, a non-3GPP access capability of at least one UP functional entity, and selecting, by the CP functional entity from the at least one UP functional entity based on the non-3GPP access capability of the at least one UP functional entity, the target UP functional entity supporting the non-3GPP access, wherein the obtaining the non-3GPP access capability of at least one UP functional entity comprises obtaining, by the CP functional entity through a domain name system DNS query, the non-3GPP access capability of the at least one UP functional entity; or obtaining, by the CP functional entity, a configured non-3GPP access capability of the at least one UP functional entity, wherein when each of the at least one UP functional entity establishes a connection to the CP functional entity, the CP functional entity receives a connection establishment request message sent by the UP functional entity, wherein the connection establishment request message carries the non-3GPP access capability of the UP functional entity.

* * * * *